(12) United States Patent
Karim et al.

(10) Patent No.: US 12,334,116 B2
(45) Date of Patent: Jun. 17, 2025

(54) IMAGE DIFFUSION FRAMEWORK FOR TEXT-GUIDED VIDEO EDITING

(71) Applicant: University of Central Florida Research Foundation, Inc., Orlando, FL (US)

(72) Inventors: Nazmul Karim, Orlando, FL (US); Nazanin Rahnavard, Orlando, FL (US); Umar Khalid, Orlando, FL (US); Chen Chen, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/955,385

(22) Filed: Nov. 21, 2024

(65) Prior Publication Data
US 2025/0166664 A1    May 22, 2025

Related U.S. Application Data

(60) Provisional application No. 63/601,439, filed on Nov. 21, 2023.

(51) Int. Cl.
*G11B 27/031*    (2006.01)
*G06F 40/40*    (2020.01)

(52) U.S. Cl.
CPC ............ *G11B 27/031* (2013.01); *G06F 40/40* (2020.01)

(58) Field of Classification Search
CPC .............................. G11B 27/031; G06F 40/40
See application file for complete search history.

(56) References Cited

U.S. PATENT DOCUMENTS

| 2023/0095092 A1* | 3/2023 | Xiao | ......................... G06T 5/70 |
| | | | 382/254 |
| 2024/0171788 A1* | 5/2024 | Kreis | ............. H04N 21/234363 |

* cited by examiner

*Primary Examiner* — Mishawn N. Hunter
(74) *Attorney, Agent, or Firm* — Anton J. Hopen; Smith & Hopen, P. A.

(57) ABSTRACT

The invention provides a method for adapting a text-to-image (T2I) diffusion model for video editing by using spectral decomposition to achieve controlled spectral shifts in the model's weights. This adaptation involves maintaining constant singular vectors while selectively adjusting singular values in response to a text prompt. A spectral shift regularizer constrains adjustments, particularly limiting changes to larger singular values to ensure minimal deviation from the original model's structure. This approach allows efficient, prompt-driven video editing by modifying specific elements according to the prompt while preserving the original video context. By focusing on selective spectral adjustments, the method reduces adaptation time and computational demands, making it suitable for real-time and resource-sensitive applications, such as dynamic video editing for streaming services.

30 Claims, 20 Drawing Sheets

Fig. 4
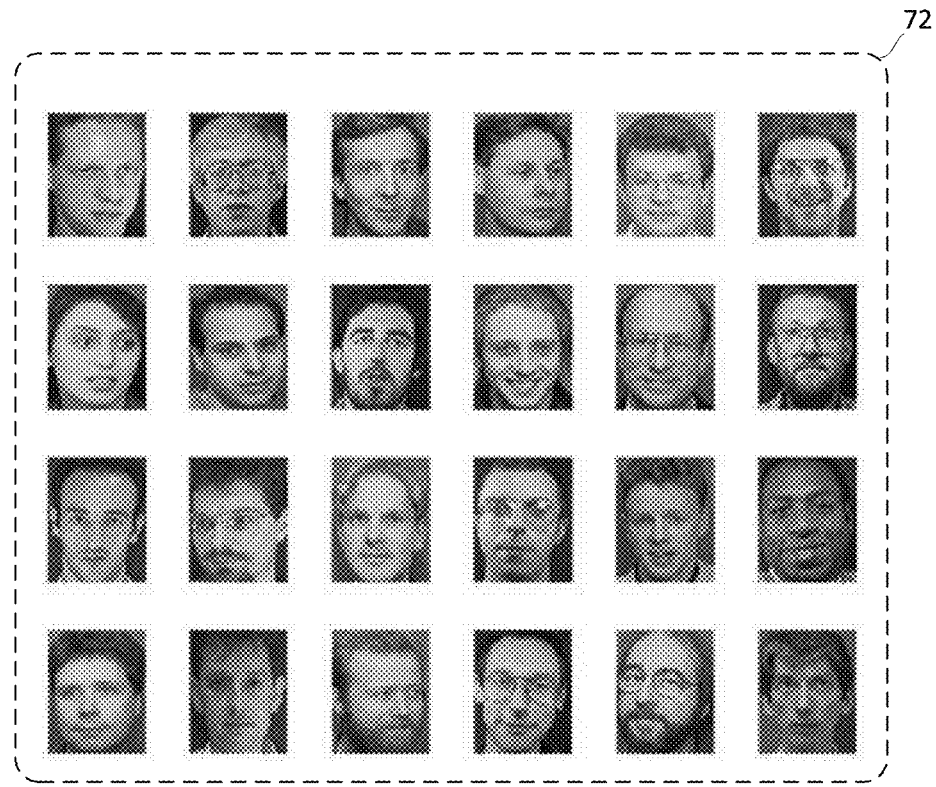
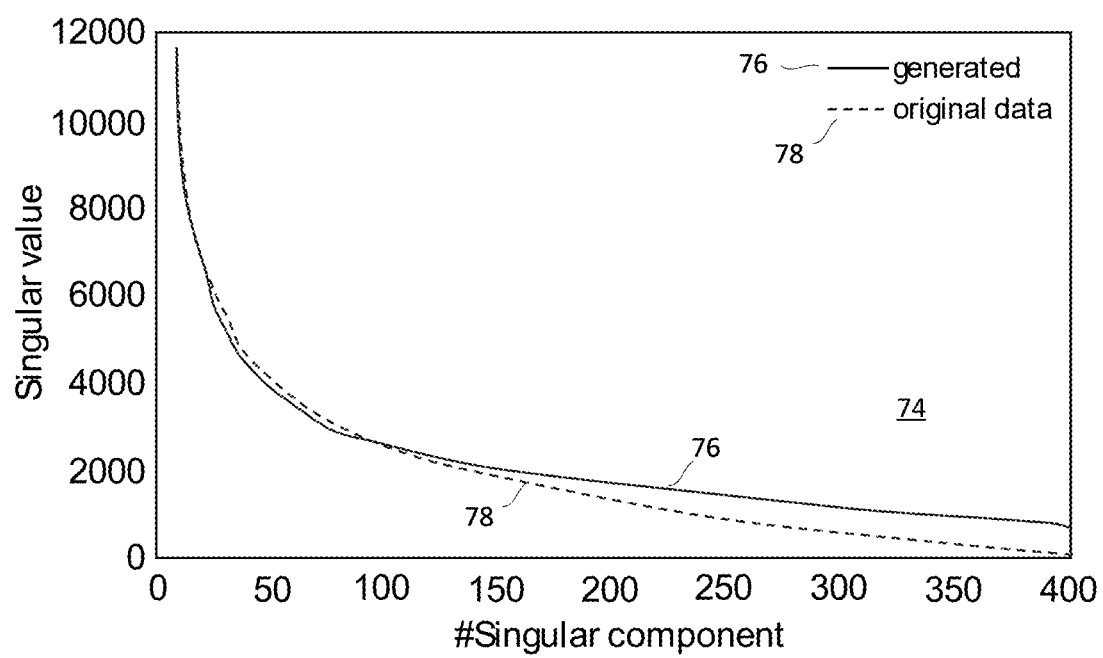

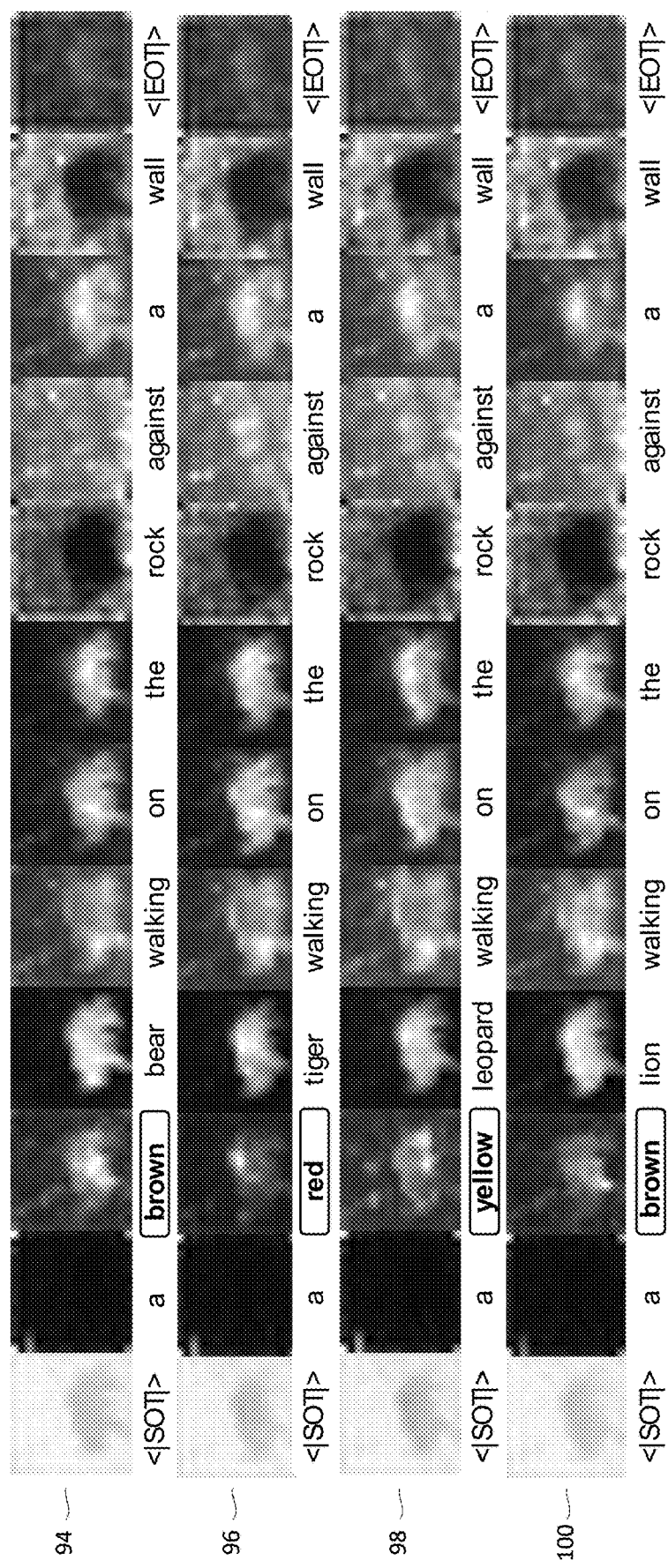

1  Input: A source prompt $\mathcal{P}$ and a source video $X$ with $F$ frames.
2  Output: An editing prompt $\mathcal{P}^*$ and edited video $X^*$.
3  Parameter: Number of timesteps $T$, Number of attention layers $L$, Number of iterations $K$
4  Fine-tuning: ;                                                        // We first perform the fine-tuning
5  Obtain clean latents using the encoder, $x_f^0 = \mathcal{E}(X); f = 1 \ldots F$
6  Forward diffusion process for noisy latents, $z_t = \{z_f^t; f = 1 \ldots F\}$ where $t = 1 \ldots T$;   // Gradually add noise to the clean latents
7  Inflated T2V model ($\theta$) initialized from Stable Diffusion (SD) T2I model ($\theta_I$)
8  $W_i^Q = U_i \Sigma_i V_i^T; i = 1 \ldots L$ where $\Sigma_i = \text{diag}(\sigma_i)$;  // Spectral decomposition of query matrices
9  Initialize Spectral Shift Parameter, $\delta_i = \text{Zeros}(P); P = \text{size}(\Sigma_i)$;  // Singular value differences
10 $\Sigma_i' = \text{diag}(\text{ReLU}(\sigma_i + \delta_i))$ ;                // New updated formulation of $\Sigma_i$
11 Total spectral shift $\delta = [\delta_1, \delta_2, \ldots, \delta_L]$ ;    // For all attention layers
12 for $k = 1, 2, \ldots, K$ do
13 $\quad t \sim \text{Uniform}(\{1, \ldots, T\})$ ;                          // For Timestep Embedding
14 $\quad \epsilon \sim \mathcal{N}(0, I)$ ;                                  // Noise Sampling
15 $\quad \mathcal{L}(\theta) = \mathbb{E}_{z_0, \epsilon} \|\epsilon - \epsilon_\theta(z_t, t, p)\|_2^2 + \lambda \mathcal{L}_r$ ;  // Calculate Loss
16 $\quad$ Update $\theta$ using $\nabla_\theta \mathcal{L}(\theta)$
17 end
18 Fine-tuned model $\theta$
19 Inference: Set $T = 50, s = t_0 = 7.5$ ;
20 DDIM Inversion of $X$ to obtain $z_T$ for $t = T, T-1, \ldots, 1$ do
21 $\quad z_{t-1} = \sqrt{\alpha_{t-1}} \left( \frac{z_t - \sqrt{1-\alpha_t} \epsilon_\theta(z_t)}{\sqrt{\alpha_t}} \right) + \sqrt{1-\alpha_{t-1}} \epsilon_\theta(z_t)$  // Number of inference steps
22 end
23 Return $X^* = \mathcal{D}(z_0)$

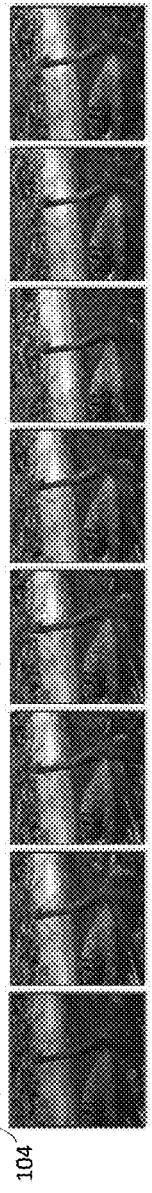
Fig. 8

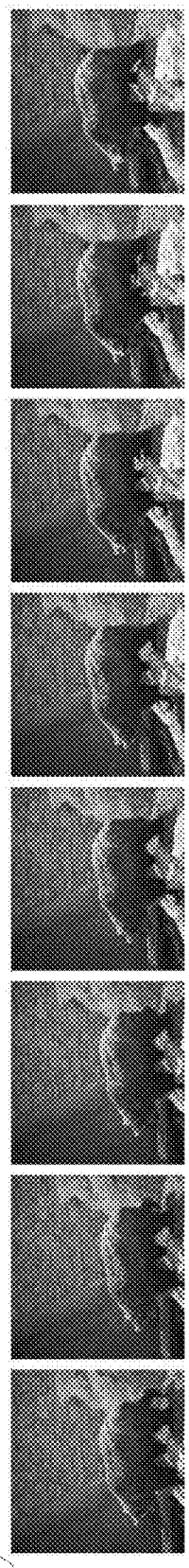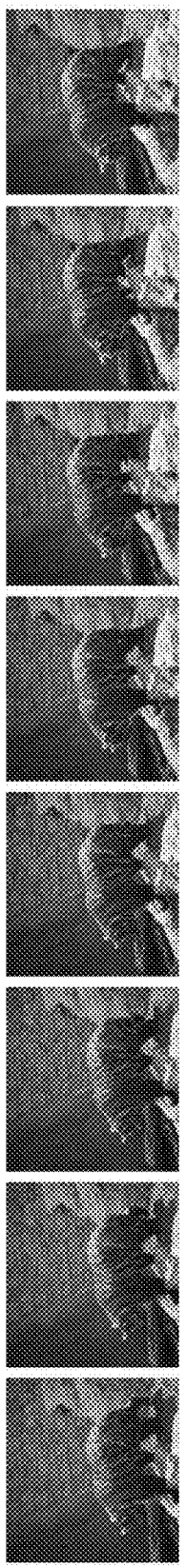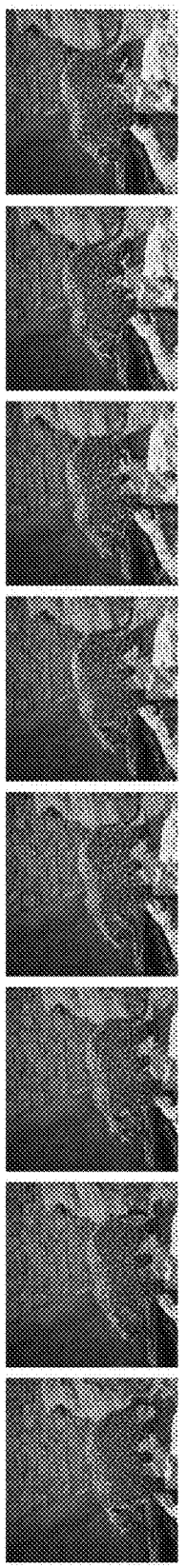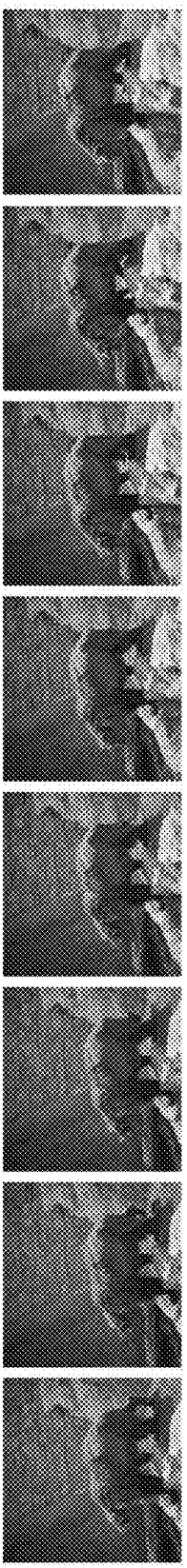
Fig. 9

Spatio-temporal Attention

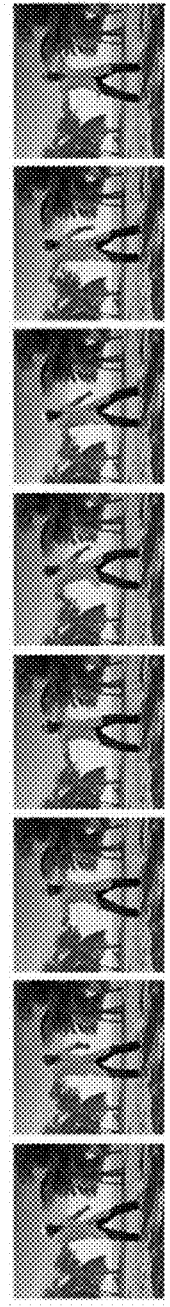 A man in pink shirt is dancing in the beach.
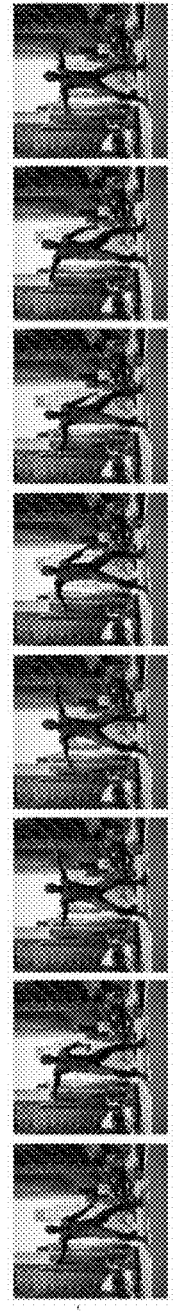 Spiderman is dancing in New York City.
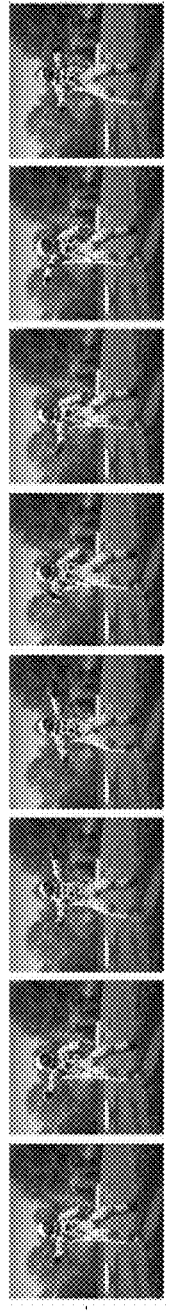 An astronaut is dancing in the garden.
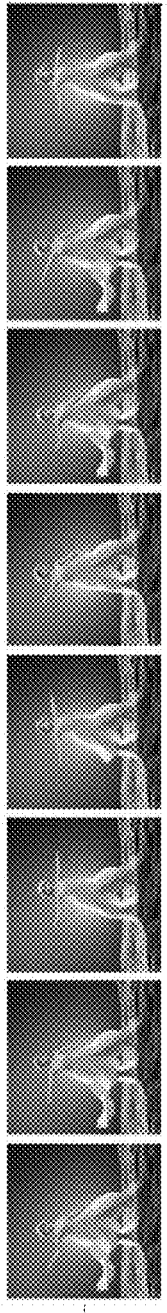 A girl in blue dress is dancing on the moon.
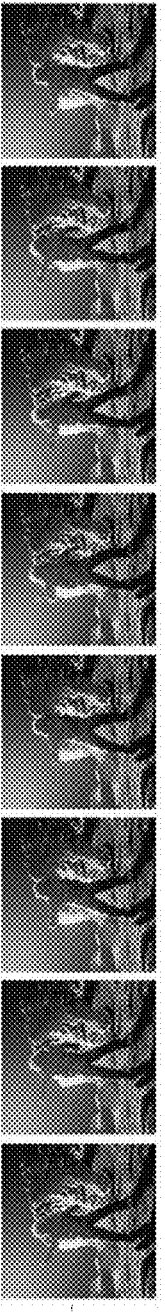 Failed Case: A tiger is dancing on the moon.
Fig. 17

IMAGE DIFFUSION FRAMEWORK FOR TEXT-GUIDED VIDEO EDITING

CROSS REFERENCE TO RELATED APPLICATIONS

The present application claims the benefit of the filing date of U.S. provisional patent application Ser. No. 63/601,439, filed on Nov. 21, 2023, the disclosure of which is incorporated herein by reference.

BACKGROUND OF THE INVENTION

1. Field of the Invention

The described embodiments relate generally to video content editing using diffusion models. Specifically, the described embodiments relate to systems and methods for adapting text-to-image diffusion models to video editing by employing spectral decomposition to fine-tune spectral shifts in the model's parameters, facilitating efficient and targeted modifications of video content based on textual descriptions.

2. Brief Description of the Related Art

The current state of the art in generating visual content from textual descriptions has predominantly revolved around Text-to-Image (T2I) diffusion models. These models have been pivotal in synthesizing high-fidelity images based on textual prompts, leveraging advanced deep learning techniques and extensive training on large image-text pair datasets. However, the transition from static images to dynamic video content—Text-to-Video (T2V)—presents a plethora of complexities that extend beyond the capabilities of traditional T2I models. The temporal dimension inherent in videos necessitates maintaining coherence across frames, a challenge not encountered in still images. Addressing this has led to two primary methods.

The first involves direct training of T2V models on extensive text-video pair datasets. This approach, while conceptually straightforward, is encumbered by the sheer volume and complexity of the requisite datasets, making the training process not only time-intensive but also computationally burdensome. The second method attempts to adapt existing T2I models to video by modifying them for each specific video. While this is computationally less demanding than the first method, it is still a resource-intensive process, requiring considerable time and computational power for per-video adaptation.

BRIEF SUMMARY OF THE INVENTION

In response to these challenges, the Spectral-Shift-Aware Adaptation for Video Editing (SAVE) technology has emerged as a useful solution. Unlike previous methods, SAVE innovates by fine-tuning the spectral shift in the parameter space of pre-trained T2I models. This approach employs the mathematical process of spectral decomposition, where the weights of neural networks are dissected into their constituent components—eigenvalues and eigenvectors. In the context of SAVE, singular value decomposition (SVD) is utilized, a variant of spectral decomposition applicable to non-square matrices. The technology focuses on modulating the singular values (spectral shift) of these decomposed weights, while maintaining the integrity of the singular vectors. This methodological shift from traditional parameter tuning to spectral shift modulation offers several advantages.

The invention includes a method for adapting a text-to-image (T2I) diffusion model to enable editing of video content. The method is characterized by its use of spectral decomposition to discern singular values and singular vectors from the weights of a pre-trained T2I model. A key feature of this method is the selective fine-tuning of the singular values (spectral shift) while keeping the singular vectors unchanged. This adaptation is guided by textual prompts that specify the desired video content alterations. A spectral shift regularizer is integrated within this method to control the extent of the spectral shift, especially imposing stricter constraints on the adjustment of larger singular values to prevent considerable deviations from the original T2I model's weights. This regularization is tailored to allow more significant modifications to smaller singular values, promoting a fine balance between model adaptability and fidelity to the original model structure.

Further, the method facilitates the editing of video content in a manner that selectively alters specific elements within the video as dictated by the textual prompts, while preserving the video's original background and context. This results in an efficient video editing process that significantly reduces the time and computational resources typically required for such adaptations. Additionally, the method incorporates a predetermined threshold within the spectral shift regularizer, delineating the allowable spectral shift for each singular value. This ensures a controlled adaptation process conducive to real-time or near-real-time applications, such as streaming services where rapid content editing is desired. The adjustment of singular values is carried out to prioritize the retention of semantic content as specified by the textual prompts during the video editing process, allowing for precise and contextually aware modifications to the video content.

In more specific detail, the invention comprises a method, system, and computer-readable media for adapting a text-to-image (T2I) diffusion model to enable text-driven video editing. Initially, the process involves receiving, by at least one processor, a video composed of multiple frames along with a text prompt that specifies desired modifications to particular visual elements within the video. This text prompt provides the basis for guiding the model in adjusting selected portions of the video content according to user input while maintaining temporal coherence across frames.

To implement these adjustments, the system performs spectral decomposition on at least one weight matrix of the pre-trained T2I diffusion model. This spectral decomposition process divides the matrix into a set of singular values and corresponding singular vectors, enabling more granular control over the model's parameters by isolating these components. The invention then generates a spectral shift parameter matrix by selectively modifying only the singular values, based on the specifications of the text prompt, while the singular vectors remain unchanged. This selective adjustment allows the model to respond flexibly to prompt-specific visual alterations without affecting the foundational structure of the model's weights.

Following the generation of the spectral shift parameter matrix, the system applies a spectral shift regularizer, which governs the extent of adjustments made to the singular values. The spectral shift regularizer is configured to impose tighter restrictions on singular values with larger magnitudes while allowing more flexibility in adjusting smaller singular values. This regularization framework minimizes the risk of deviating significantly from the original model structure, thereby maintaining stability and coherence in the output.

The method continues by adapting the pre-trained T2I diffusion model using the spectral shift parameter matrix. This adaptation results in an altered model capable of modifying specific visual elements within the video in alignment with the text prompt. The process culminates in the output of an edited video where the specified visual elements are transformed across multiple frames according to the prompt. Importantly, the edited video preserves non-targeted visual elements and maintains temporal coherence across frames, ensuring a seamless and consistent viewing experience.

In some embodiments, spectral decomposition is applied specifically to the query matrices within attention layers of the T2I diffusion model. Each query matrix undergoes decomposition into singular values and singular vectors, with adjustments restricted to the spectral shift parameter matrix. This selective approach to decomposition and adjustment within attention layers enhances the precision of the modifications, allowing the model to respond more directly to prompt-driven content changes within attention-based processing stages.

The system may further refine each adjustment in the spectral shift parameter matrix by making these adjustments a function of the text prompt. Each modification in the spectral shift matrix is selectively calculated to either increase or decrease individual singular values, corresponding to prompt-specified changes in the visual content. This targeted alteration allows for fine-grained control over the model's response to the text prompt, aligning the video content with the user's specified visual attributes.

Additionally, the spectral shift regularizer can be configured to apply a rectified linear unit (ReLU) activation function to each adjustment in the spectral shift parameter matrix. This ReLU function serves to limit the extent of adjustment for each singular value to a pre-established maximum, ensuring that modifications remain within a controlled range. By capping the adjustments, the ReLU function reinforces the system's stability and prevents excessive transformations that could compromise the coherence of the final video output.

In another embodiment, a temporal embedding is initialized across the plurality of frames in the video to enforce frame-to-frame coherence as adjustments from the spectral shift parameter matrix propagate through the adapted model. This temporal embedding works in tandem with the spectral adjustments to retain spatial and temporal consistency throughout the editing process, preserving the flow of motion and continuity across frames even as visual elements are selectively altered.

Furthermore, the adapted model is configured to restrict modifications to only those regions or features specified in the text prompt, leaving non-targeted regions of the video unchanged. This selective adaptation process ensures that only the prompt-specified elements undergo transformation, preserving the surrounding visual context and preventing unintended alterations to other regions of the video.

The system also generates cross-attention maps based on the text prompt, which serve to identify target regions within the latent representations of each frame. These cross-attention maps guide the application of spectral shift adjustments, focusing on areas within the video that are relevant to the prompt, thus enhancing the precision of the editing process by directing modifications specifically to prompt-relevant content.

To optimize alignment between the model's output and the text prompt, the spectral shift parameter matrix may be iteratively fine-tuned over a set number of epochs. In each epoch, the spectral shift adjustments are updated in response to any discrepancies between the model's current output and the visual content specified by the prompt, gradually refining the alignment and ensuring that the final video output closely reflects the intended modifications.

Once the adapted model has processed the latent representations of the video frames, the invention outputs an edited video by applying a diffusion process to these latents. During this diffusion process, the adjustments encoded in the spectral shift parameter matrix are applied to generate frames that are aligned with the text prompt. This process integrates the spectral adjustments into the model's generative framework, ensuring that each frame in the final video reflects the specified modifications while preserving coherence across frames.

In certain embodiments, the adapted model uses classifier-free guidance as an additional mechanism to balance between the original content and the prompt-directed edits. This classifier-free guidance operates by scaling the influence of modifications within the spectral shift parameter matrix based on a guidance scale factor. A guidance scale factor of 1 preserves the original content, while values greater than 1 amplify the influence of the prompt on the final video output, providing control over the degree of transformation applied.

The invention also provides a method for adapting a T2I diffusion model to support text-driven video editing using an inflated text-to-video (T2V) model. This adaptation process begins by receiving, through at least one processor, an input video composed of multiple frames, accompanied by an editing prompt that specifies desired transformations. Each frame of the input video is encoded to produce clean latent representations, which minimize spatial redundancy and prepare the frames for diffusion-based processing. By condensing each frame into a latent form, the system reduces computational load and establishes a foundation for more efficient editing operations.

To support frame-to-frame coherence and spatial consistency during the editing process, the system initializes an inflated T2V model derived from the T2I diffusion model. The inflated T2V model incorporates temporal layers, which are specifically designed to manage continuity across frames, ensuring that changes applied to one frame naturally propagate to adjacent frames without disrupting the video's overall flow. This inflated model framework facilitates the adaptation of the originally static T2I diffusion model into a dynamic structure suitable for video content, where temporal coherence is essential.

In the adapted T2V model, the system performs spectral decomposition on the query matrices within each attention layer. Through this decomposition, each query matrix is divided into its constituent singular values and singular vectors, enabling controlled adjustment of the model weights. By isolating singular values from their corresponding singular vectors, the system allows selective modulation of model parameters in response to the editing prompt, without globally altering the original model's configuration.

The system then generates a spectral shift parameter matrix, which calculates differential adjustments to the singular values while preserving the singular vectors unchanged. This matrix applies a rectified linear unit (ReLU) function to constrain adjustments within a specified range, limiting the extent of modification to maintain stability and avoid excessive transformations that could disrupt the coherence of the output.

In alignment with the principles of spectral shift modulation, the system employs a spectral shift regularizer to selectively modify each singular value based on its magnitude. Singular values with larger magnitudes are subject to tighter constraints, whereas smaller singular values can undergo more relaxed adjustments. This balance, controlled by the spectral shift regularizer, prevents drastic shifts in model behavior while allowing the model to adapt responsively to the editing prompt. By fine-tuning the T2V model through iterative optimization of the spectral shift parameter matrix across frames, the system aligns the model output closely with the prompt, adjusting visual elements in the video to match the specified transformations.

Upon completion of this fine-tuning process, the system outputs an edited video, where modifications conform to the prompt's specifications, while preserving the video's background and ensuring temporal coherence across frames. This dual preservation of visual consistency and temporal alignment enables seamless viewing experiences and ensures that prompt-directed edits do not compromise the original video's context.

In some embodiments, the fine-tuning process includes sampling a noise embedding at each time step for each frame. This noise embedding is incorporated into a forward diffusion process that incrementally adds noise to the latent representations, producing a set of progressively noised frames. By simulating the addition of noise, this embedding helps the model refine its response to the prompt, enhancing alignment between the generated frames and the target transformations.

The spectral shift regularizer may further scale adjustments in inverse proportion to the magnitude of each singular value, facilitating finer adjustments to minor components and imposing tighter control over major components. This dynamic scaling optimizes the precision of each modification, aligning prompt-driven changes with the inherent structure of the original model's weights.

To reinforce temporal coherence, the input video may be encoded as a sequence of temporally aligned latents, where the editing prompt directs adjustments to specific regions or objects within each frame. By localizing modifications, the model ensures that changes remain confined to prompt-relevant areas, preserving the spatial integrity of non-targeted regions.

Additionally, the system may employ a classifier-free guidance scale (scfg) hyperparameter to balance between original video content and prompt-directed edits. An scfg value of 1 preserves the original content with minimal influence from the prompt, while higher values amplify prompt-driven modifications, allowing the user to control the intensity of the transformation.

The method may also apply a Deterministic Denoising Diffusion Implicit Model (DDIM) inversion process to decode the noised latent frames. This DDIM inversion reconstructs each frame based on the adjusted singular values, using the prompt as a guide to maintain fidelity to the desired edits. By reversing the noising process, DDIM inversion enables granular reconstruction of the frames, ensuring that each edited frame aligns closely with the prompt.

In further embodiments, the system performs iterative steps to minimize the noise discrepancy between the model's noise estimates and the actual frame noise. Through successive updates to the model parameters, these iterations improve prompt-specific alignment, refining the model's response to the input and achieving high-precision adjustments across frames.

To maintain frame-wise consistency, the system initializes a temporal embedding across the frame sequence, reinforcing spatial and temporal coherence as adjustments propagate. This embedding supports the smooth transfer of changes from one frame to the next, preserving the integrity of the video's motion dynamics while applying selective edits.

When processing localized features within the video, the editing prompt may modify elements such as color, object identity, or movement direction, while retaining the continuity of non-targeted areas. This selective modification process ensures that only prompt-specified features undergo transformation, with surrounding visual content preserved in its original state to maintain contextual consistency.

The T2V model may also be fine-tuned using a gradient-based optimization process, where a prompt-specific loss function iteratively refines the spectral shift parameters over a defined number of time steps. This targeted optimization process further aligns the model's output with the prompt, ensuring precise and context-aware modifications that extend throughout the frame sequence.

In an alternative embodiment, the invention provides a method for zero-shot video generation from a text prompt using a pre-trained T2I diffusion model. In this approach, the system receives a text prompt describing the desired video content, specifying attributes such as object identity, actions, and other details across a multi-frame sequence. The pre-trained T2I model undergoes temporal modifications to produce a T2V model, incorporating frame-wise attention mechanisms that adapt the model for video generation without task-specific fine-tuning.

Within this zero-shot framework, frame attention mechanisms generate temporally coherent frames based on the prompt, using fixed keys and values derived from initial frames' latent representations. This frame attention ensures that visual elements remain consistent across frames, preserving temporal alignment even in the absence of extensive model retraining.

The system may also employ sparse-causal cross-frame attention to link each frame to its immediate predecessors, supporting temporal coherence while reducing computational complexity. By focusing on immediate prior frames, sparse-causal attention maintains frame-to-frame consistency without imposing excessive processing demands.

To further enforce spatial coherence across the video, the system utilizes spatio-temporal attention, which generates an attention map spanning all frames in the sequence. This attention map preserves spatial continuity of objects within each frame, ensuring that prompt-specific elements are aligned and consistently rendered throughout the video.

The result of this zero-shot video generation process is a coherent multi-frame video, where each frame reflects the prompt-specified attributes, with smooth transitions between frames and cohesive visual continuity. This method enables efficient, prompt-driven video generation, offering flexibility for dynamic content creation without requiring task-specific fine-tuning or complex reconfiguration.

In embodiments where cross-frame attention includes causal masking, each frame references only prior frames, maintaining causal consistency in alignment with temporal progression. This structure prevents unintended feedback loops between frames, supporting stable and coherent video generation.

When implementing frame attention, the system may limit this mechanism to anchor frames, from which keys and values propagate through subsequent frames to maintain temporal structure. By focusing attention on these anchor points, the system optimizes coherence across frames while managing computational load.

In some cases, the prompt may be encoded using a Contrastive Language-Image Pre-training (CLIP) text encoder, generating embeddings that guide frame generation. This encoding ensures that each frame remains aligned with the prompt conditions, preserving the semantic integrity of the generated content.

Sparse-causal attention may restrict references to frames within a defined temporal window, balancing temporal coherence with computational efficiency. This attention configuration ensures that objects persisting across frames maintain consistent visual characteristics without incurring excessive computational costs.

The spectral shift adjustments within this framework may be calculated for singular values associated with attention weights, with each adjustment bounded by a ReLU function to prevent destabilizing transformations. By limiting these adjustments within a pre-specified range, the system achieves stable video generation, with consistent frame appearance and alignment.

Temporal embeddings may be initialized for each frame sequence to enhance the model's zero-shot generation capabilities. These embeddings capture prompt-specific motion dynamics, preserving the intended flow of movement across frames, ensuring that video content generated in response to the prompt displays fluid and contextually appropriate transitions.

The T2V model is further configured with tunable parameters that may be adjusted at runtime, allowing emphasis on specific prompt aspects, such as object positioning or motion direction. These tunable parameters grant the user greater control over the generated video's alignment with the prompt.

In other implementations, the system applies DDIM inversion to translate noisy latent representations into temporally synchronized frames based on the encoded prompt, ensuring that each generated frame conforms to prompt-specific details. This inversion process supports precise and cohesive frame generation without compromising the integrity of the model's responses.

Lastly, the system enables multi-object transformations within the generated video based on the prompt. Cross-frame attention mechanisms ensure that each object retains coherent placement and appearance across frames, fully aligning with the specified attributes in the prompt. This consistency in object representation across frames enhances the video's narrative continuity, making the final output suitable for various practical applications.

BRIEF DESCRIPTION OF THE DRAWINGS

For a fuller understanding of the invention, reference should be made to the following detailed description, taken in connection with the accompanying drawings, in which:

FIG. 4 shows a set of samples from AT&T dataset and the distribution of singular values.

FIG. 6 shows additional attention maps in terms of region-wise editing effects.

FIG. 7 shows pseudocode for the SAVE method described herein.

FIG. 8 shows shape editing results according to an embodiment of the invention.

FIG. 9 shows attribute editing according to an embodiment of the invention.

FIG. 17 shows zero-shot video generation with given poses without any training.

DETAILED DESCRIPTION OF THE PREFERRED EMBODIMENT

Figure 1:
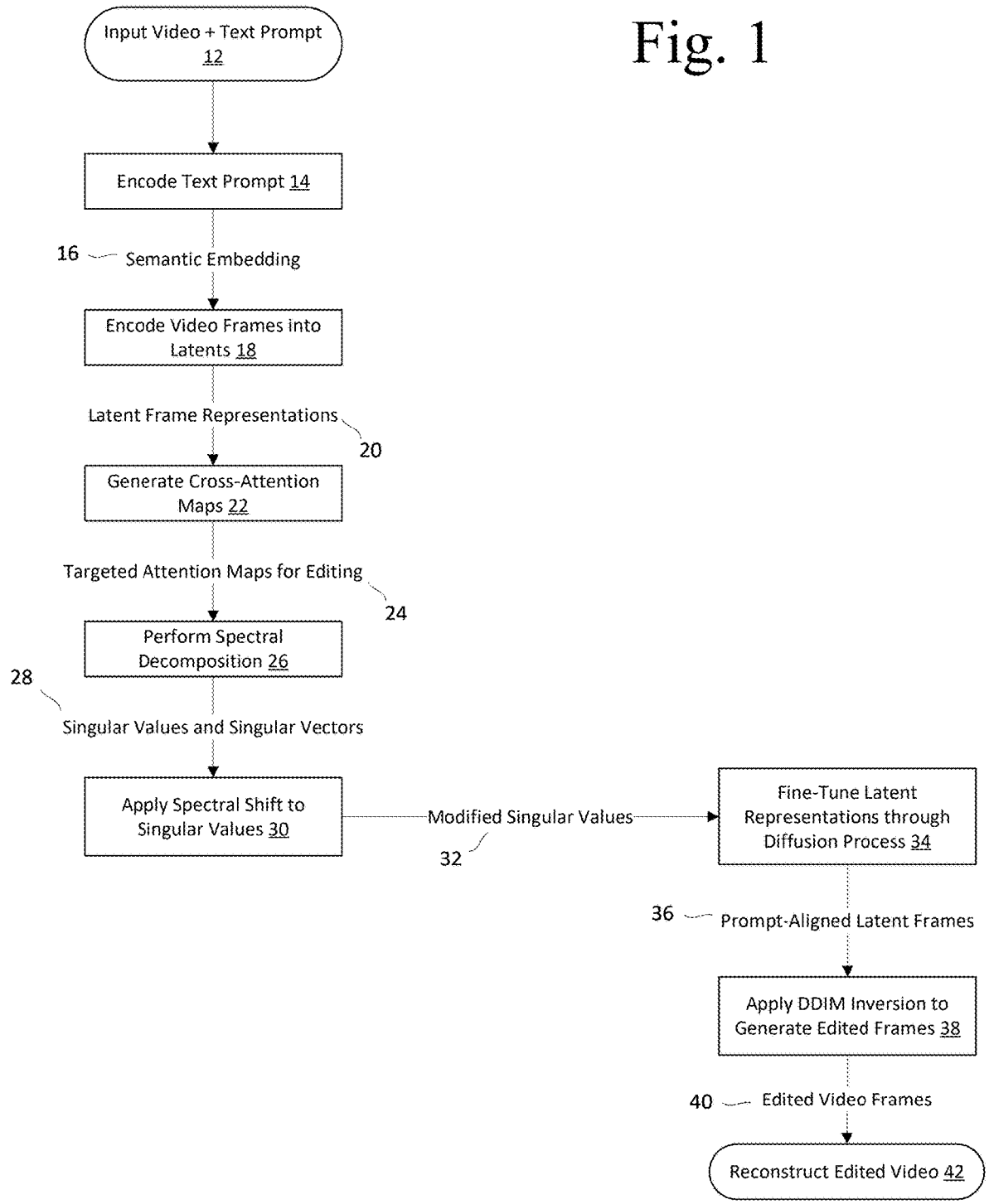
FIG. 1 is a flowchart, high-level overview of an embodiment of the invention.

The process illustrated in FIG. 1 outlines a method for adapting a text-to-image (T2I) diffusion model to perform efficient text-driven video editing, with careful management of the model's weights through spectral shift and regularization. This method starts with the input of both a video and a text prompt at 12. The video comprises a series of frames that will be edited according to the content specified by the prompt. The text prompt encodes the intended modifications, such as object replacement, color adjustments, or spatial transformations. This combination of input video and descriptive prompt forms the basis for the subsequent video editing process, allowing a pre-trained model to adapt to video content without full retraining.

Once the video and prompt are received, the process initiates with the encoding of the text prompt at 14. In this step, the prompt is converted into a semantic embedding that captures the essential features and characteristics described in the text. This is typically achieved using a text encoder, such as the Contrastive Language-Image Pre-training (CLIP) model or a similar architecture. The text encoder translates the prompt into a vector space, producing a semantic embedding at 16 that encodes the prompt's instructions into a mathematical representation. This embedding provides a structured guide for how the video content should be adjusted to match the prompt, acting as a bridge between textual descriptions and visual alterations.

Following the encoding of the text prompt, each frame of the input video is processed to generate latent representations, as shown at 18. This step involves encoding each video frame into a latent space, which reduces the dimensionality and complexity of the frame data while preserving its essential features. These latent frame representations at 20 encapsulate the visual content in a form that is suitable for manipulation and alignment with the prompt. By encoding the frames in this way, the method creates a structured data space that facilitates efficient adjustments across frames, allowing transformations to occur without directly altering the high-dimensional video data.

Once the video frames are in latent form, the process moves to the generation of cross-attention maps at 22. These attention maps play a crucial role in aligning the prompt with the latent frame representations. By establishing links between specific elements in the text embedding and corresponding areas in the video frames, the cross-attention maps at 24 highlight the regions of interest that will be subject to modification. This attention mechanism focuses the model's capacity on the aspects of the frames that are relevant to the prompt, ensuring that edits are targeted and do not interfere with unrelated regions. The attention maps are thus instrumental in guiding the model's focus, helping to apply changes that are both accurate and localized.

With cross-attention maps generated, the process then performs spectral decomposition at 26 on the query matrices within the attention layers of the model. Spectral decomposition breaks down these matrices into singular values and singular vectors, effectively isolating the model's underlying structure. This decomposition at 28 enables selective adjustments to the model's weights, where only the singular values-responsible for the intensity and scale of certain features—are modified, while the singular vectors, which define directional aspects, remain fixed. By separating these components, the method provides a controlled means of fine-tuning the model's response to the prompt. Spectral decomposition is essential here because it allows for precise, resource-efficient changes without disrupting the foundational alignment learned by the original T2I model.

After decomposing the spectral components, the next stage applies spectral shifts to the singular values at 30. These shifts are modifications based on the prompt's instructions, effectively scaling or adjusting the influence of specific features in response to the prompt. The selective adjustment of singular values, without altering singular vectors, allows the model to adapt its output in a controlled manner. Here, a spectral shift regularizer is employed to further refine these adjustments, imposing constraints to prevent significant deviation from the original model's weight structure. The modified singular values at 32 reflect the adapted focus and intensity levels specified by the text prompt, achieving a transformation in the latent space that is prompt-aligned yet structurally stable.

Following spectral adjustments, the process proceeds to fine-tune the latent representations through a diffusion process at 34. This step refines the modified latent frames, allowing the model to iteratively correct and align the content with the prompt. The diffusion process involves adding and then removing noise within the latent space, which stabilizes the transformations and enforces a coherent update across frames. This stage produces prompt-aligned latent frames at 36, where the visual changes specified by the prompt are embedded in a temporally consistent manner. The diffusion process operates as a refining mechanism, smoothing out inconsistencies and ensuring that each frame aligns with its neighbors, thereby preserving the continuity of the video.

To produce the final edited frames, the process applies Deterministic Denoising Diffusion Implicit Model (DDIM) inversion at 38. DDIM inversion reverses the noise introduced during the diffusion process, gradually reconstructing the latent representations into edited video frames that closely match the input prompt. This step removes residual noise and clarifies the visual details, resulting in a set of edited video frames at 40 that are prompt-aligned and exhibit frame-to-frame coherence. DDIM inversion is crucial for generating high-quality, realistic frames that incorporate the desired transformations without introducing artifacts or temporal disruptions.

Finally, the edited frames are compiled into the output video at 42. This step reconstructs the edited frames into a continuous video sequence, presenting the transformations specified by the text prompt in a fluid, consistent manner. The reconstructed edited video at 42 preserves the original video's background and context, with only the targeted elements altered according to the prompt. This approach enables efficient, real-time editing capabilities suited to applications such as streaming, where dynamic content modification is required. By focusing adjustments on spectral shifts within the latent space and applying regularization to constrain these changes, the method achieves a resource-efficient, scalable editing solution that minimizes computational overhead while maximizing fidelity to the prompt.

Figure 2:
FIG. 2 is a series of illustrative outputs from an input video according to an embodiment of the invention.

FIG. 2 showcases a series of frames from a video that has been edited using a text-to-video (T2V) technology. The original input video 50, as indicated by the text above the first set of frames 52, features a lion roaring on a rock. Subsequent sets of frames depict various animals—a bear 54, a jaguar 56, a wolf 58, and a tiger 60—each positioned on the rock 62 and portrayed as if they are roaring, similar to the original lion scenario.

This illustrates the capabilities of the T2V editing technology to modify video content based on textual prompts. The framework utilizes a model that can interpret and implement changes to video content, altering the appearance of the subject in the video in line with the descriptive text. In this case, the textual prompts provided indicate different animals roaring on the rock 62, and the T2V model has edited the original video 50 (lion roaring on the rock) to match each of these prompts.

The edited frames maintain the original setting—the rock 62 and the background 64—ensuring that only the subject of the video (the roaring animal) is altered, which demonstrates the model's ability to selectively edit video content while preserving the context. This selective editing is essential for applications where the background context must remain consistent, and only specific elements within the video require alteration.

The technology effectively interprets the textual descriptions and implements the corresponding visual changes, showcasing its potential for creating diverse content from a single video source. Such capability could be particularly useful in the media and entertainment industries, as well as in advertising and educational content creation, where tailored visual content is often required.

Figure 3:
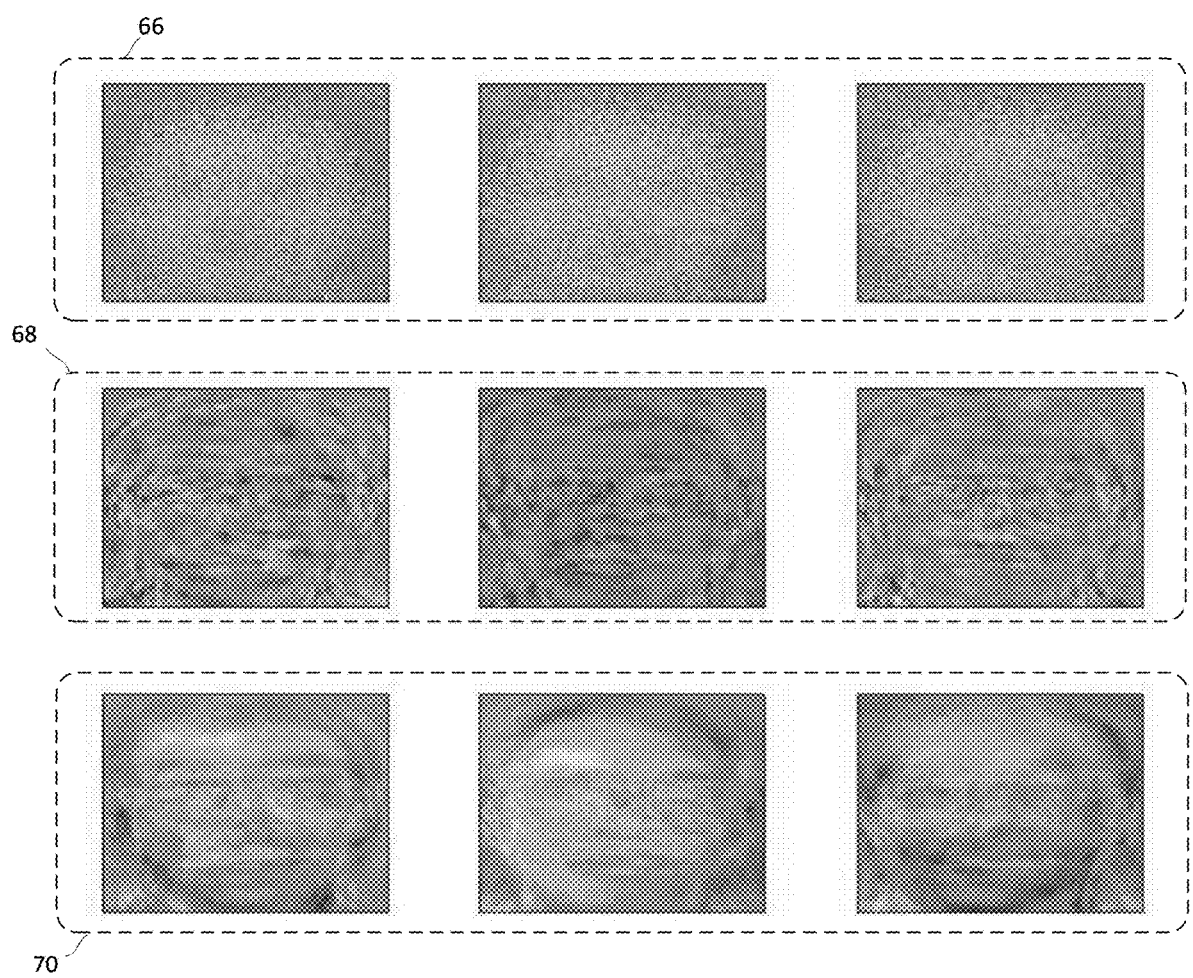
FIG. 3 is a series of images showing the impact of generating random samples in the spectral domain and adapting spectral coefficients to statistics of the real samples.

FIG. 3 illustrates a text-to-video (T2V) editing framework that adapts a pre-trained text-to-image (T2I) model for generating video sequences by incorporating temporal coherence across frames. This adaptation framework involves taking an initial video input (X) and a text prompt (P) that specifies desired modifications, such as altering scene characteristics or the appearance of objects within the video. The figure is divided into three rows labeled 66, 68, and 70, which represent progressive stages in the model's adaptation process. Row 66 displays the original input video frames prior to any modifications. Row 68 shows intermediate frames where the T2I model has begun applying changes based on the prompt, resulting in partial adjustments to the visual elements within each frame. Finally, Row 70 presents the completed output frames in which the T2V model has fully integrated the prompt's modifications, achieving consistent alterations across all frames that align with the specified prompt.

This framework illustrates the process by which a T2I model is extended to recognize and maintain temporal dependencies, producing a coherent sequence of frames in response to the input prompt. The system employs a diffusion process to generate noisy latent representations of the video, which are then conditioned using a CLIP text encoder that translates the text prompt into a compatible representation for the model. The unique aspect of this model is its approach to fine-tuning, which involves adjusting the singular values derived from the spectral decomposition of the pre-trained weights, rather than modifying the weights themselves. This method, focusing on spectral shift, reduces the number of trainable parameters, thereby aiming to decrease the adaptation time and computational resources required.

Attention mechanisms are incorporated to preserve content consistency across video frames and to maintain coherent motion. The fine-tuning phase applies a spectral shift regularizer to the larger singular values to prevent significant deviations from the original T2I model's weights, while allowing more flexibility for smaller singular values.

During inference, the system uses Deterministic Denoising Diffusion Implicit Models (DDIM) inversion to reconstruct the edited video from noisy latents based on a new editing prompt (P*). The reconstructed video's adherence to the original or the edited prompt is determined by the classifier-free guidance scale (scfg). A scfg of 1 indicates an aim to retain the original video content, whereas a value greater than 1 suggests greater influence from the editing prompt on the video output.

The framework is designed to provide a method for editing video content in response to textual descriptions, with a focus on reducing the adaptation time and resources compared to previous methods. It demonstrates an application of adapting existing neural network architectures to new modalities, in this case, extending the capabilities of a T2I model to handle video data through temporal inflation and fine-tuning based on spectral shift. The inference process balances the original content with the modifications indicated by the textual prompt, modulated by the classifier-free guidance scale.

The primary benefit of SAVE is the significant reduction in adaptation time. By concentrating on the spectral shift, the technology achieves the requisite adaptation approximately tenfold faster compared to traditional methods. This rapid adaptation capability is not only a time saver but also translates to substantial computational resource savings. Moreover, the introduction of a spectral shift regularizer ensures that adaptations adhere closely to the original model, preventing excessive deviations from pre-learned patterns. This regularizer imposes stricter constraints on larger singular values, while allowing more flexibility with smaller ones. As a result, SAVE maintains a delicate balance between incorporating new learning and retaining the foundational aspects of the original T2I model.

The utility and benefits of SAVE technology are extensive and varied, permeating various sectors where rapid and efficient video content generation or modification is vital. In the realm of creative content generation, such as in the entertainment industry, SAVE facilitates the production of imaginative visual effects and animations based on textual descriptions, significantly accelerating the creative process. It also plays a pivotal role in editing undesirable content in video streaming, where it can swiftly adapt to edit out or modify unwanted elements, a task that previously demanded extensive manual labor.

In marketing and advertising, SAVE's capacity to create personalized video content based on textual inputs presents a novel avenue for engaging customers. This technology also finds applications in educational and training tools, where it aids in generating educational videos or simulations tailored to specific textual descriptions. Its utility extends to film and theatre production, assisting directors and designers in visualizing scenes through pre-visualizations or storyboards generated from textual narratives.

Moreover, SAVE's efficient adaptation mechanism is a boon for automated video moderation systems, identifying and altering problematic content in videos. In the burgeoning field of video game development, the technology enhances the gaming experience by generating dynamic, text-driven visual content that responds to in-game narratives or player inputs. Finally, SAVE's potential in creating accessibility features, such as content for visually impaired individuals, marks a significant step forward in inclusive technology, enabling the generation of descriptive videos from textual narratives.

SAVE technology represents a paradigm shift in AI-driven video editing, offering a more practical, efficient, and versatile method for adapting T2I models to video content. Its integration into various real-world applications is revolutionizing the way we create, modify, and interact with video content, underscoring its transformative potential across multiple industries. As the technology continues to evolve, its influence is poised to expand, opening new frontiers in digital content creation and modification.

Validation of Approach

DDIM Sampling and Inversion. During inference, the inventors applied deterministic DDIM sampling to convert a random noise $z_T$ to a clean latent $z_0$ with the help of trained diffusion model ($\theta$):

$$z_{t-1} = \sqrt{\alpha_{t-1}}\left(\frac{z_t - \sqrt{1-\alpha_t}\,\epsilon_\theta(z_t)}{\sqrt{\alpha_t}}\right) + \sqrt{1-\alpha_{t-1}}\,\epsilon_\theta(z_t), t = T, \ldots, 1, \quad (1)$$

where $$\alpha_t = \Pi_{i=1}^{t}(1-\beta_i)$$

is a parameter for noise scheduling. DDIM Inversion is the reverse process of DDIM sampling where we can map a clean latent $z_0$ to a noisy latent $\hat{z}_T$:

$$\hat{z}_T = \sqrt{\alpha_t}\left(\frac{\hat{z}_{t-1} - \sqrt{1-\alpha_{t-1}}\,\epsilon_\theta(\hat{z}_{t-1})}{\sqrt{\alpha_{t-1}}}\right) + \sqrt{1-\alpha_{t-1}}\,\epsilon_\theta(\hat{z}_{t-1}), t = T, \ldots, 1, \quad (2)$$

For applying DDIM inversion to a video, the process inverts each frame of the input video to a noise space. To reconstruct the original latent space using $\mathcal{P}$, we set the classifier-free guidance scale $\mathcal{S}_{cfg}$ to 1.

On the other hand, to perform editing operations, the method finds the variables in the latent space that corresponds to the frame contents. After that, we can edit contents by finding editing directions in the latent space. The editing direction is usually provided by $\mathcal{P}$ * while setting $\mathcal{S}_{cfg} \gg 1$. While using a large $\mathcal{S}_{cfg}$ gives more freedom in editing, this freedom can also lead to frame inconsistency. Furthermore, the issue of error accumulation can also cause such inconsistency given consideration of 50 DDIM inversion steps. These issues are less prominent once the T2V model is fine-tuned with a text-video pair ($\mathcal{X}, \mathcal{P}$) that aligns the text embedding with the video content. To obtain better alignment, the text encoder $\mathcal{C}$ is also fine-tuned for improved text-video alignment.

Low-Rank Adaptation (LoRA) built on the insight that pre-trained language models, despite being projected to a smaller subspace, possess a low "intrinsic dimension" and retain efficient learning capabilities. This insight led to this invention's approach that weight updates during adaptation also possess a low "intrinsic rank." To constrain the update of a pretrained weight matrix $W_0 \in \mathbb{R}^{d \times k}$, LoRA decomposes it as $W_0 + \Delta W = W_0 + BA$, where $B \in \mathbb{R}^{d \times k}$, $A \in \mathbb{R}^{d \times k}$, and the rank $r \ll \min(d, k)$. During training, $W_0$ remains static without receiving gradient updates, while A and B contain trainable parameters.

Both $W_0$ and $\Delta W = BA$ are applied to the same input, and their respective output vectors are combined coordinate-wise. For $h = W_0 x$, the revised forward pass equation becomes:

$$h = W_0 x + \Delta W x = W_0 x + BA x \quad (3)$$

In Table 1, a simple comparison is shown with baseline methods. Unlike CogVideo and MAV, the model is not trained from scratch. Compared to SOTA, this method has additional functionalities such as Zero-Shot capability with approximately 100× less tunable parameters. For training, an Adam optimize is employed with betas 0.9 and 0.999 and a weight decay of 5e-3. In an embodiment of the invention, F(=12) frames are taken where each frame has a resolution of 512×512. For video editing a guidance of scale $\mathcal{S}_{cfg}$ of 7.5 is used.

TABLE 1

| Method | CogVideo | MAV | Text2LIVE | TAV | Video-P2p | SAVE |
|---|---|---|---|---|---|---|
| Full Training | ✓ | ✓ | ✓ | x | x | x |
| Zero-Shot | ✓ | ✓ | x | x | x | ✓ |
| #Tunable Parameters | N/A | N/A | N/A | 24M | 24M | 0.2M |

Eigenvalues of a diagonal matrix are equal to diagonal elements. However, in the case of non-diagonal matrices, non-diagonal elements deviate eigenvalues from the diagonal elements. According to the Gershgorin circle theorem, eigenvalues of a square matrix are bounded within a circle with the center at the $n^{th}$ diagonal element and the radius is the absolute summation of non-diagonal elements at the $n^{th}$ column. Thus, in order to find a bound for each eigenvalue, it is sufficient to find a bound for the absolute summation of non-diagonal elements of that matrix.

Let $U_\tau \Sigma_\tau V_\tau^T$ show SVD of D and $U_\tau \Sigma_\tau V_\tau^T$ point to decomposition of $D_g$ in terms of singular vectors of D. Spectral coefficients of D and spectral coefficients of $D_g$ are defined as $C = U_\tau^T D$ and $C_g = U_\tau^T D_g$. Since $U_\tau$ is a unitary matrix, singular values of D are equal to singular values of C and singular values of $D_g$ are equal to those of $C_g$.

Singular values of $C_g$ are equal to the square root of eigenvalues of $C_g^T C_g$.

According to the definition of $C_g$, the diagonal elements of $C_g^T C_g$ is $N_\tau (m_n^2 + 2 m_n x_n + x_n^2)$. In which, $m_n$ is the mean of the $n^{th}$ spectral coefficient and $x_n$ is a deviation with variance $v_n$. Similarly, a non-diagonal element at the (i, n) entry is equal to $N_\tau (m_i m_n + m_i x_n + m_n x_i + x_{ixn})$. Expected values of the non-diagonal entries of $C_g^T C_g$ will be:

$$E[C_g^T C_g] = [a_{i,n}]$$

$$a_{i,n} = N_\tau m_i m_n$$

Summation of non-diagonal elements of the $n^{th}$ column is equal to $N_\tau m_n \Sigma_{i \neq n} m_i$. This summation is an upper bound for the deviation of the $n^{th}$ eigenvalue. Mean and variance of $C_g$ entries are coming from the mean and variance of the original spectral coefficients C. In other words, C is a sample from a random matrix, $C_g$. Thus, the $n^{th}$ eigenvalue of C lies within the same circle as $C_g$. The maximum distance between eigenvalues of C and $C_g$ will be 2 times the corresponding Gershgorin circle.

$$|\sigma_n^2(D) - \sigma_n^2(D_g)| \leq 2 N_\tau m_n \sum_{i \neq n} m_i$$

$$|\sigma_n^2(D) - \sigma_n^2(D_g)| \leq \frac{2 N_\tau m_n \sum_{i \neq n} m_i}{\sigma_n^2(D) - \sigma_n^2(D_g)}$$

Spectral Shift Optimization

FIG. 3 shows how regularization of spectral components is able to generate more diverse and statistically similar samples to the original samples. There are three sets of generated samples using 400 samples of AT&T face dataset. In the first row 66, the mean and variance of each pixel are used to generate a new random sample. In the second row 68, a new random sample is generated by a random and unconstrained combination of spectral components. While the third row 70 shows pursuing singular values of the original dataset results in more naturally generated samples.

FIG. 4 shows a set of samples from AT&T dataset 72 and the distribution of singular values 74. Regularizing generated samples 76 restricts main spectral components to follow the spectrum of original data 78 while it allows small singular values to deviate more from the original spectrum in order to span fine details. Adapting the spectral coefficients change the generation capability leading to different outputs. In the case of DNN based generator, the weights control the generation capability. Adapting the spectral shift of weights operates similarly to adapting the spectral coefficients of a linear generator. Although DNN is a more powerful generator and requires more care while adapting.

An embodiment of the invention employs a spectral shift regularizer for fine-grained control of the overall editing. Terminology such as coarse-matching and fine-matching is used to better describe the reflection of textual command on the edited contents in the video. In summary, these terms describe whether the edited video accurately reflects the target text condition. The "coarse matching" involves the initial alignment or broad association of textual descriptions with features present in the diffusion-edited image. This phase aims to establish a general correspondence between the provided text and the visual elements within the image. In contrast, "fine-matching" delves into a more detailed and precise alignment between the specific elements mentioned in the text description and the nuanced details or finer aspects within the diffusion-edited image. It focuses on pinpointing and aligning intricate details or specific features referenced in the text with corresponding visual elements present in the image.

Figure 5:
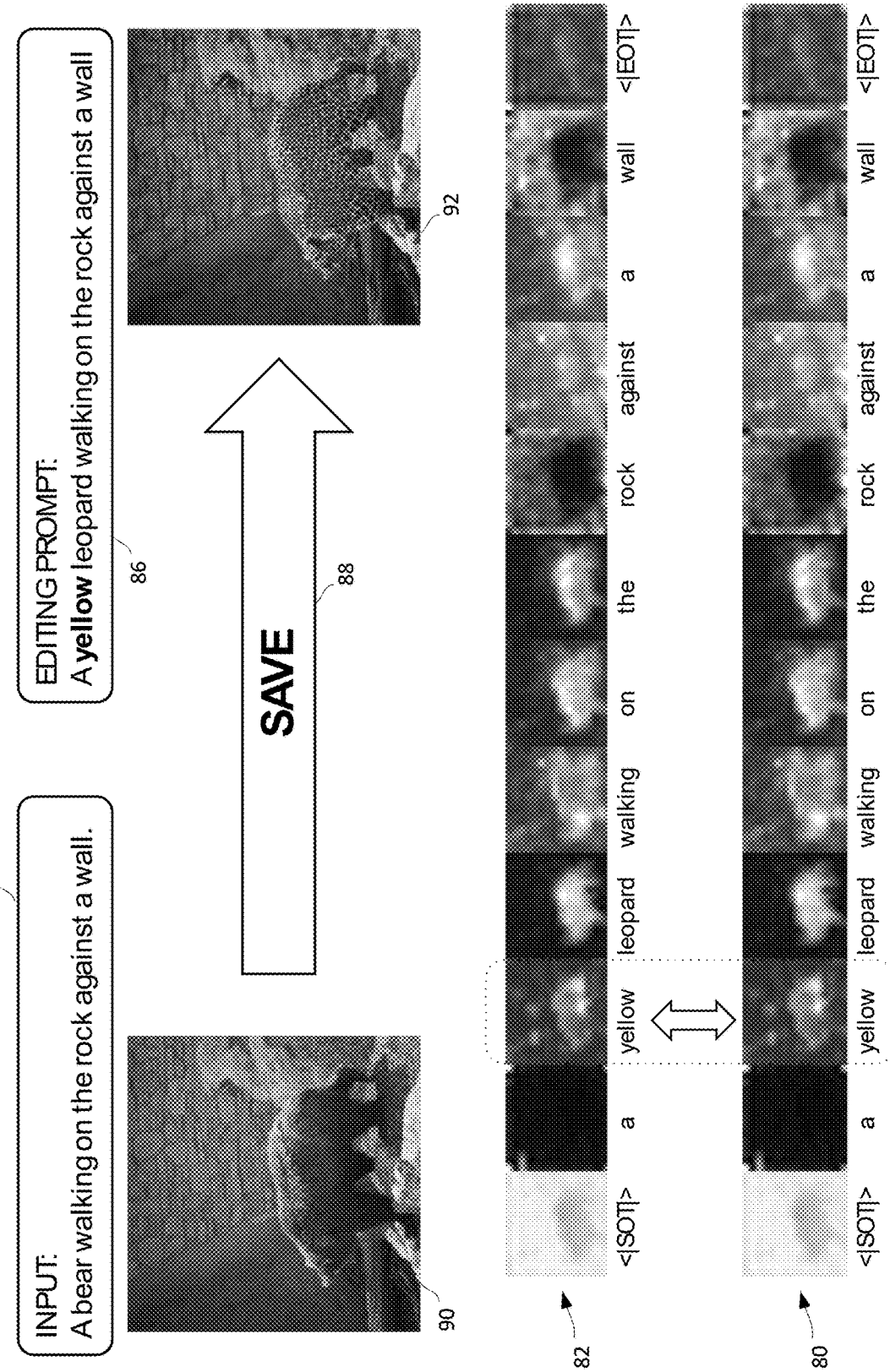
FIG. 5 shows the impact of the invention's regularizer illustrated through attention maps.

FIG. 5 shows the model attention maps with 80 and without 82 the regularizer. With the use of the regularizer, the generated cross-attention (CA) maps are more compact and on point. This provides the fine-matching ability shown by the special token attention. The regularizer keeps the special token's attention from being spread out any further than the coarse class token. For example, from the input 84 modified by editing prompt 86 via the special token attention 88, the word yellow only affects the animal area (e.g., bear in image 90 and leopard in image 92) and no other regions. FIG. 6 displays additional attention map visualization of the regularizer. The attention maps show that the regularizer is on point in terms of region-wise editing effects. These results also show the capabilities of SAVE in handling diverse command prompts.

Figure 10:
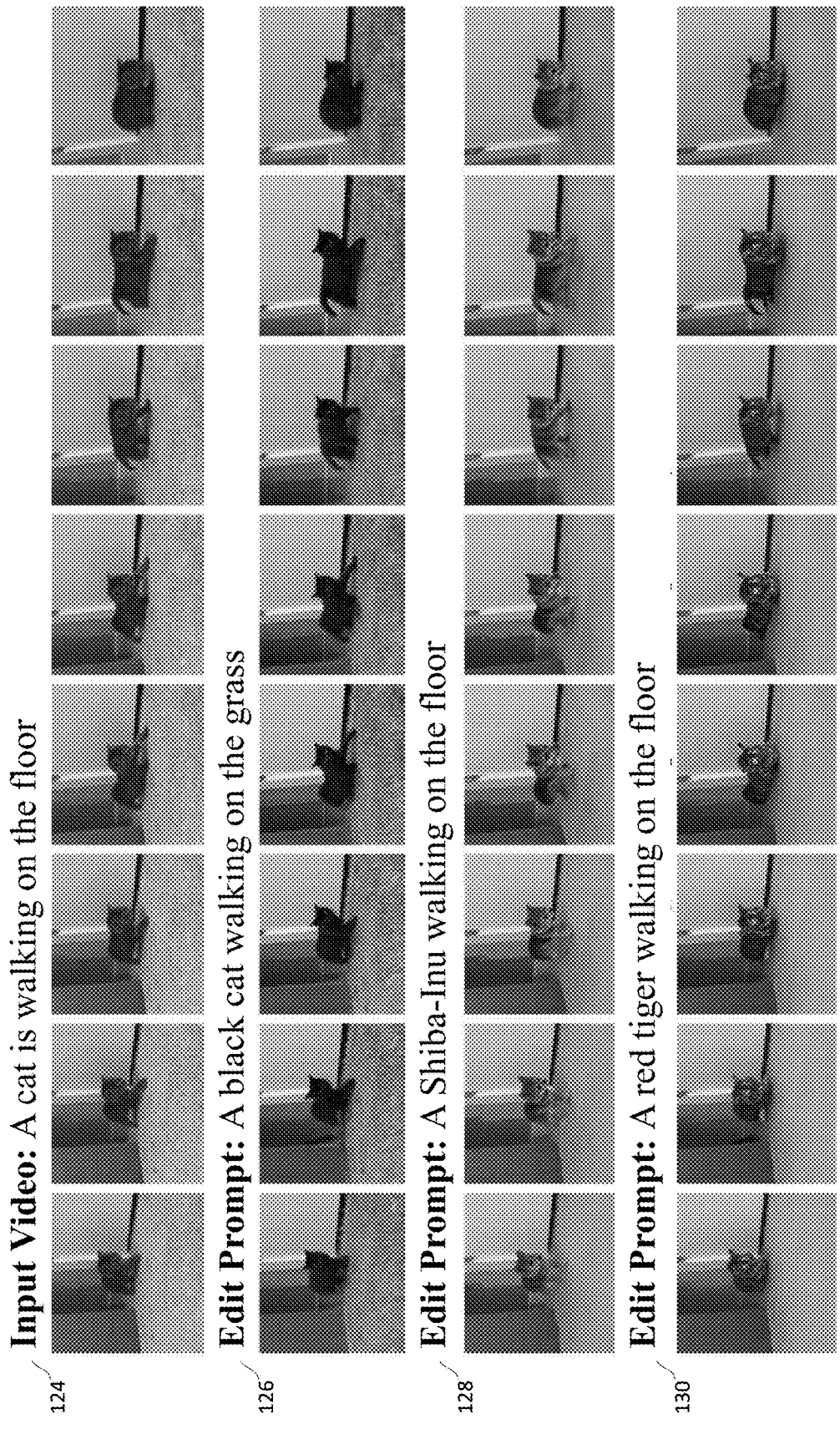
FIG. 10 shows additional attribute editing according to an embodiment of the invention.

FIG. 7 provides pseudocode for an embodiment of the SAVE algorithm. FIG. 8 illustrates shape editing results according to the invention. The first row 104 shows the frames of the input video. In the second row, the input video has been edited based on the prompt 106, and "swan" is replaced with "duck." Similarly, the shape of the object has been successfully edited and conditioned on the input prompt in the subsequent rows where prompt 108 stylizes the image in "cartoon style"; prompt 110 changes the "duck" to a "pelican"; prompt 112 specifies a "white duck and with a yellow beak"; and prompt 114 specifies a "pink flamingo." In FIG. 9, input video 116 provides a "brown bear walking on the rock." Prompt 118 modifies the bear to a red tiger. Prompt 120 specifies a yellow leopard. Prompt 122 specifies a brown lion. FIG. 10 illustrates attribute editing for color and animal type initialized with input video 124 of a cat walking on a floor. Prompt 126 changes the cat color to black but also specifies it walks "on the grass." Prompt 128 changes the animal type to a "Shiba-Inu." Finally, prompt 130 changes the animal to a "red tiger."

User Study

Inventors conducted a user study to assess frame consistency, textual alignment, and realistic quality. The study involved presenting four videos generated by our method, as well as baselines, to raters in a randomized order. The raters were tasked with evaluating temporal consistency for frame consistency assessment and determining video alignment with the given textual description for textual alignment evaluation. Each example was annotated by 20 participants, and the final outcome was determined through a majority vote. This user study allowed us to gather subjective judgments from multiple perspectives and obtain valuable insights into the perceived quality and alignment of the generated videos with respect to frame consistency and textual faithfulness. In Table 2, different T2V generation methods are compared based on user preference. Out of all users, 51.44% of them prefer SAVE when it comes to frame consistency.

TABLE 2

| Method | Frame Consistency | Textual Alignment | Realistic Quality |
|---|---|---|---|
| CogVideo | 2.38 | 3.25 | 4.78 |
| Tune-a-Video (TAV) | 7.14 | 13.09 | 13.28 |
| Video-P2P | 39.04 | 38.57 | 38.14 |
| Current Invention | 51.44 | 45.09 | 43.80 |

With video generation, SVD-based works from other domains may sometimes be easily overlooked. AdaLoRA is a variant of LoRA that parameterizes the incremental weight updates in the form of SVD. Note that AdaLoRA is considerably different from SAVE, as it updates both singular vectors and singular values. Although AdaLoRA and SVDiff employ similar SVD-based adaptation frameworks for NLP-related and image generation tasks, respectively, some key factors to take into consideration for video generation are: i) as the task here is to generate multiple image frames with consistent editing effect and smooth motion information, SAVE deals with a more challenging task that needs a better control on the adaptation process, ii) direct fine-tuning of the singular values without proper measures does not produce the desired editing performance, iii) both SVDiff and AdaLoRA focus on developing a practical adaptation technique, i.e. resource and computationally efficient. However, one can take additional measures other than "parameter fine-tuning" to develop an efficient adaptation technique.

Tackling the issues in i) and ii) led inventors to develop a novel spectral shift regularizer without which there exists limited editing capabilities and issues such as unwanted region influence. In Table 3 both quantitative and qualitative comparisons of AdaLoRA and SVDiff with SAVE are presented. For a fair comparison, consider the Tune-A-Video (TAV) framework with sparse-causal (SC) attention and fine-tune this framework following these two techniques. It can be observed that the inventive method achieves superior performance with better editing time. Since AdaLoRA employs an iterative approach to find the suitable rank for each layer, it takes longer to edit compared to LoRA.

TABLE 3

| Method | TAV + SVDiff | TAV + AdaLoRA | SAVE w. SC | SAVE |
|---|---|---|---|---|
| Frame Consistency | 90.16 | 93.71 | 94.53 | 94.81 |
| Text Alignment | 26.02 | 28.62 | 29.11 | 29.30 |
| Edit Time (mins.) | 5.2 | 19.4 | 5.8 | 3.0 |

Figure 11:
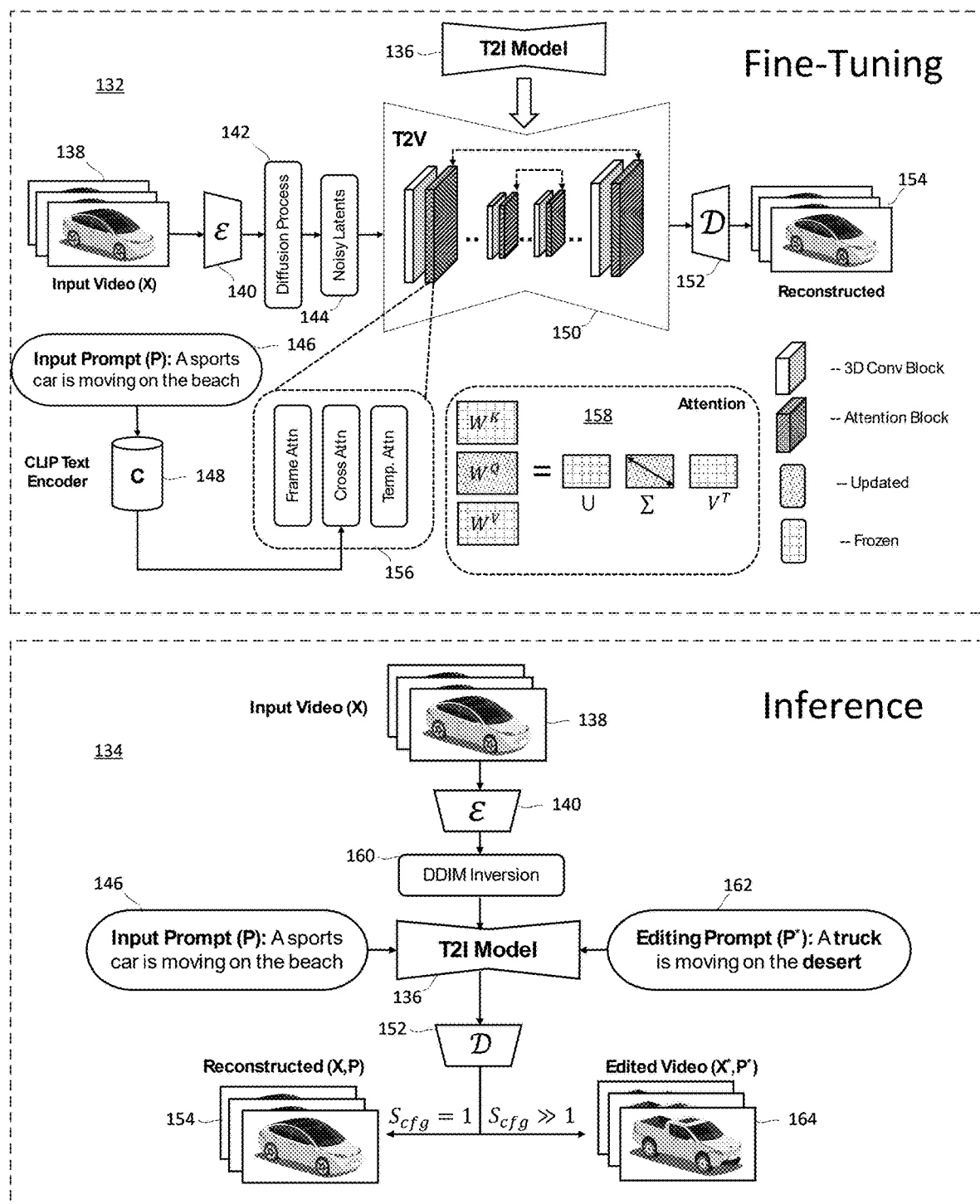
FIG. 11 is a diagrammatic view of the fine-tuning process according to an embodiment of the invention.

FIG. 11 illustrates the fine-tuning and inference processes for adapting a text-to-image T2I diffusion model to perform text-driven video editing. In the fine-tuning process shown in section 132, the process begins with receiving an input video X 138 and an input prompt P 146, which provides text-based instructions for modifying the video content. For example, the prompt specifies that "[a] sports car is moving on the beach." The text prompt P is processed by a CLIP text encoder 148, denoted as C, which converts the text into a semantic embedding. This embedding establishes connections between the text-based features and visual elements in the video frames, facilitating alignment between prompt instructions and video content.

After processing the text prompt, each frame of the input video X 138 is encoded into a latent space representation through an encoding function E 140. The frames then undergo a diffusion process 142 that introduces noise into the latent representations, generating a sequence of noisy latent frames 144 which are prepared for fine-tuning within the diffusion model. Next, the pre-trained T2I model 136 is adapted into a text-to-video (T2V) model 150 to handle the temporal and spatial consistency requirements of video content. This T2V model includes multiple layers that process the noisy latents while considering temporal coherence between frames, ensuring that changes remain consistent across the video sequence.

The T2V model applies several attention mechanisms 156 to manage spatial and temporal consistency within the video frames. These attention mechanisms include frame attention (Frame Attn), which focuses on preserving consistency within each frame; cross attention (Cross Attn), which enables alignment of features across frames to ensure continuity; and temporal attention (Temp Attn), which maintains coherence over time by aligning each frame with its neighboring frames. Within the T2V model, spectral decomposition 158 is performed on the attention weights, breaking down each weight matrix into its constituent singular values Σ and singular vectors U and $V^T$. This decomposition enables selective adjustments to the singular values in response to the prompt while keeping the singular vectors unchanged, which helps maintain the model's structural integrity.

Based on this spectral decomposition, a spectral shift parameter matrix is created by modifying only the singular values Σ according to the prompt P 146. This spectral shift matrix defines how visual features in the T2V model will be adjusted within the noisy latents to align with the prompt's instructions. The adapted model then uses a decoder D 152 to reconstruct the edited frames from the adjusted latents. This process gradually removes noise to yield a reconstructed video 154 that reflects the prompt's visual specifications, such as the sports car moving on the beach.

In the inference process shown underneath in section 134, the system receives an input video X 138, an initial prompt P 146, and an editing prompt P*162 that specifies new modifications. For example, the editing prompt may instruct, "[a] truck is moving on the desert." The input video X undergoes encoding by ε140, and a Deterministic Denoising Diffusion Implicit Model (DDIM) inversion 160 is applied. This inversion reverses the diffusion process, enabling generation of frames aligned with the editing prompt P*.

The T2I model 136 processes the prompt P 146 and editing prompt P*162 to align the latent features accordingly. Classifier-free guidance with a guidance scale $s_{cfg}$ is employed, where setting $s_{cfg}=1$ retains the original content, while a high scfg (e.g., $s_{cfg} \gg 1$) enhances the influence of the editing prompt P* on the output. The decoder D 152 produces two outputs: a reconstructed video X, P 154, which reflects the input prompt P without significant modifications, and an edited video X*, P*164, which incorporates modifications as specified by the editing prompt P*, resulting in a new video where, for instance, "[a] truck is moving on the desert."

The present invention further includes SAVE-Zero-Shot, a zero-shot video generator variant of the video editor. Using this method, production is achieved of video X={$x_i$|i∈[1, F]} with F frames for a give prompt P conditioned on motion sequences M={$m_i$|i∈[1, F]} without any fine-tuning. To achieve this, a method is disclosed that leverages pre-trained text-to-image adapters (T2I). T2I-adapters enhance the capabilities of SD in text-to-image synthesis by enabling more precise control over input conditions such as depth maps, poses, edges, and more. It adopts the U-Net architecture, similar to SD, but fine-tunes its weights to accommodate specific task-related conditions. The features from T2I adapters are added to the intermediate features of each block of the U-Net encoder.

Figure 12:
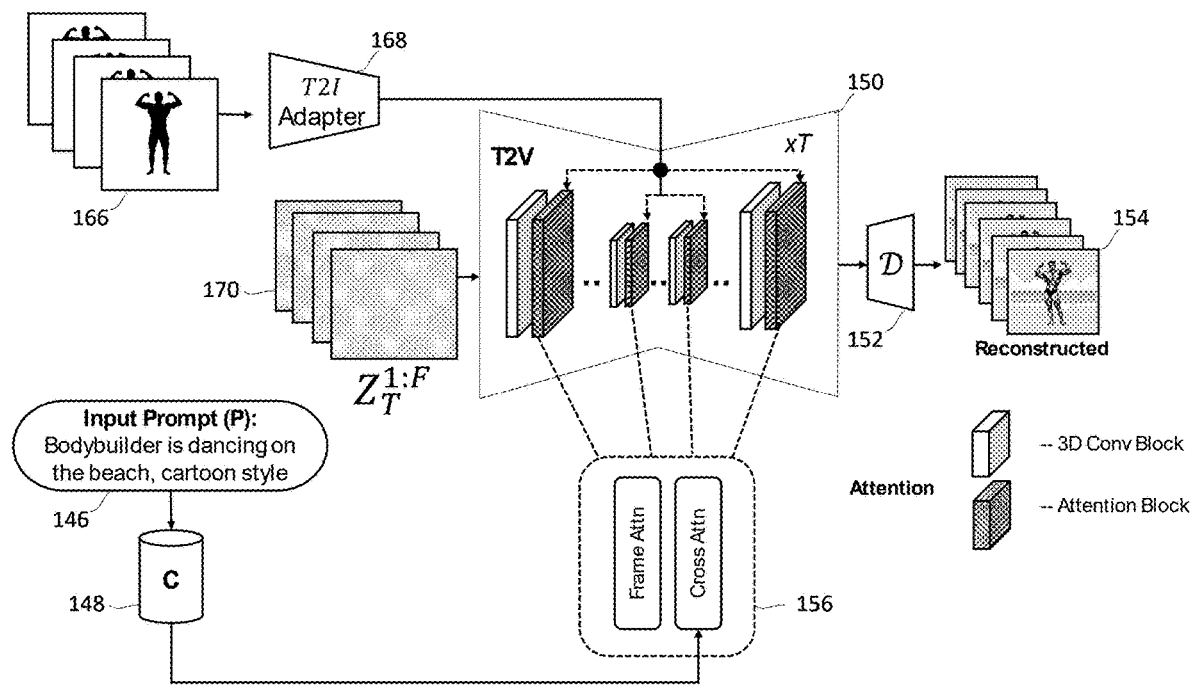
FIG. 12 is a diagrammatic view of the inference process according to an embodiment of the invention.

FIG. 12 illustrates the SAVE-Zero-Shot framework for text-to-video generation, which generates video content directly from a text prompt without requiring any additional training or temporal layers. This zero-shot approach leverages a pre-trained T2I adapter, avoiding the need for per-video fine-tuning. Instead, it applies frame-by-frame adaptations to capture motion features and maintain temporal consistency within the generated video.

The process begins with an input video represented by a sequence of frames 166, accompanied by an input prompt 146, which specifies the content and style of the desired video output. In this example, the prompt might describe a scenario like "bodybuilder is dancing on the beach, cartoon style." The text prompt is processed by a CLIP text encoder 148, which converts the prompt into a semantic embedding that aligns the intended text features with the visual attributes to be generated in each frame. This embedding provides the guidance needed for generating video frames consistent with the prompt.

Next, the pre-trained T2I adapter 168 operates on each frame independently, adapting frame-level features in a way that captures motion without explicit temporal coherence. This T2I adapter is specifically configured to extract frame-by-frame motion features $Z_T^{1:F}$ 170, which represent the motion characteristics of each frame according to the semantic embedding derived from the input prompt. These motion features are then integrated with the corresponding frame features of the U-Net encoder blocks within the T2V model 150. The integration of motion features into the encoder blocks allows the framework to produce frame-specific changes that match the prompt, ensuring that each frame aligns with the stylistic and content-based instructions of the input prompt.

The T2V model 150, which incorporates an inflated U-Net architecture derived from stable diffusion models, handles the main video generation process. It consists of multiple U-Net encoder blocks that integrate the frame-level motion features provided by the T2I adapter. This inflated architecture is specifically designed to apply stable diffusion to video generation, facilitating the creation of coherent frames that adhere to the instructions of the text prompt. As these frames are generated independently, a frame attention mechanism 156 is employed to maintain temporal consistency between frames within the video. The frame attention mechanism focuses on preserving spatial and stylistic coherence across frames, ensuring that generated content maintains consistency from one frame to the next, even though the framework operates without temporal layers or explicit frame-to-frame connections.

Once the motion features and attention-based coherence are established within the T2V model, the output passes to the decoder 152, which reconstructs the final video frames. These reconstructed frames are assembled into the output video sequence, shown as reconstructed video 154, where the generated video reflects the input prompt's specifications-such as showing a cartoon-style bodybuilder dancing on the beach. The integration of frame attention enables the SAVE-Zero-Shot framework to achieve visually consistent output despite the lack of temporal layers, producing a temporally coherent video sequence that aligns with the desired motion and appearance defined by the input prompt.

Figure 13:
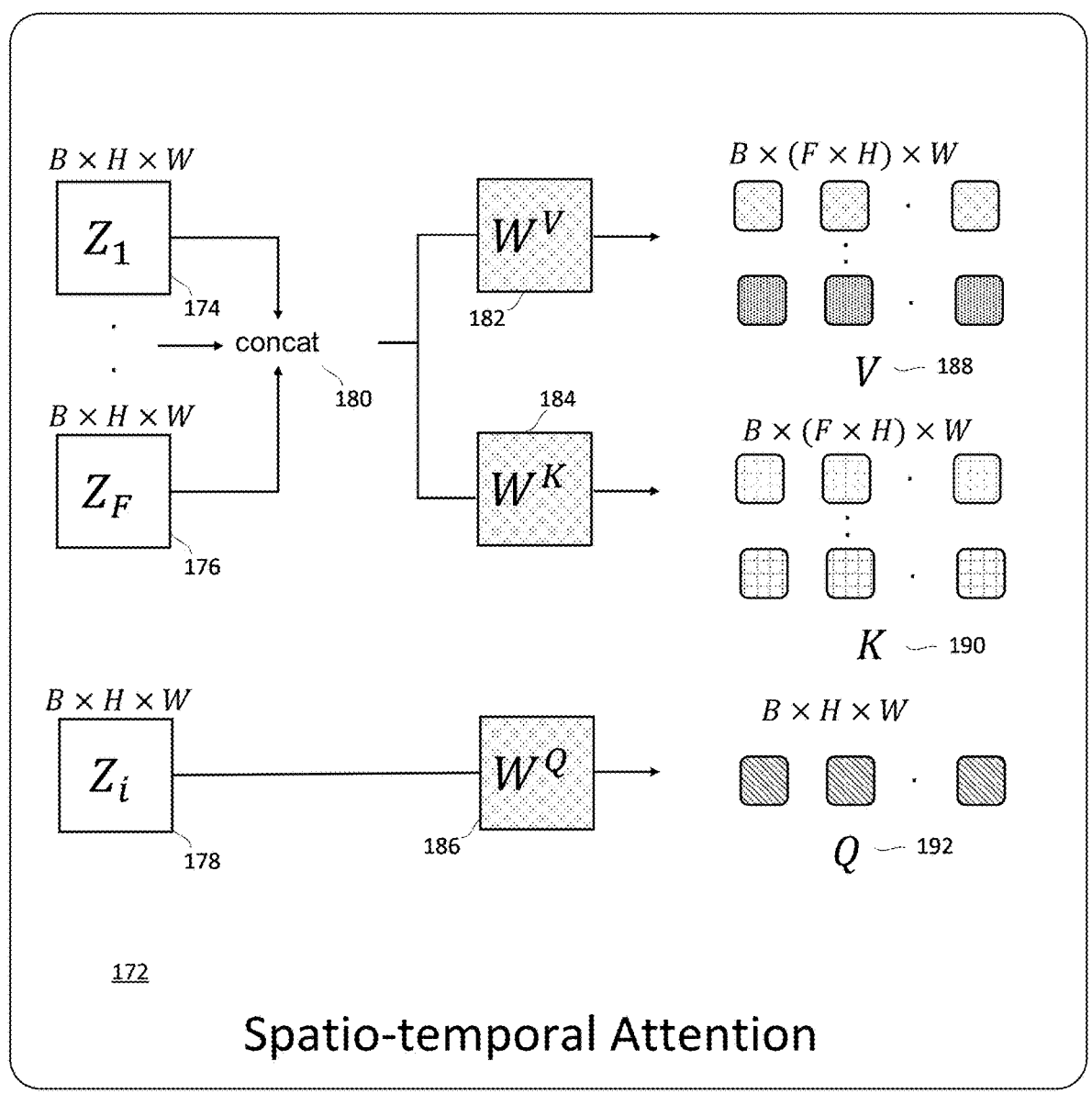
FIG. 13 is a diagrammatic view of spatio-temporal attention.

FIG. 13 illustrates the spatio-temporal attention mechanism used within the framework, labeled as section 172. This mechanism enables the model to capture both spatial and temporal relationships in a video sequence by applying attention across frames and within each frame's spatial dimensions.

The process begins with a set of latent feature maps from each frame in the sequence. Frame-level latent features $Z_1$ 174 through $Z_F$ 176, representing frames 1 through F, are concatenated along the temporal dimension, as indicated by the concatenation step 180. This concatenated sequence of feature maps combines the spatial information from each frame, preparing the features for attention-based operations that will jointly consider spatial and temporal dependencies.

After concatenation, the combined feature map is processed through two linear projection matrices, $W^V$ 182 and $W^K$ 184. These projection matrices produce two separate sets of feature maps: the value matrix V 188 and the key matrix K 190, respectively. Each matrix has dimensions B×(F×H)×W, where B represents the batch size, F represents the number of frames, and H and W represent the height and width of each frame's spatial dimensions. This configuration allows the model to represent both spatial and temporal relationships within the video sequence, as each position in V and K now corresponds to specific locations across the concatenated frames.

In parallel, the latent feature map from an individual frame $Z_i$ 178 is processed by a separate projection matrix, $W^Q$ 186, to produce the query matrix Q 192. This query matrix has dimensions B×H×W, focusing on the spatial information for the specific frame i. The query matrix allows the model to attend to locations within the frame in relation to the concatenated feature information represented by the key and value matrices. The spatio-temporal attention mechanism in FIG. 13 enables the model to compare spatial regions in a specific frame with corresponding and adjacent regions across multiple frames. By attending to features across both spatial and temporal dimensions, the model can effectively capture dependencies between different frames, helping to maintain consistency in objects, movements, and appearance throughout the video.

Figure 14:
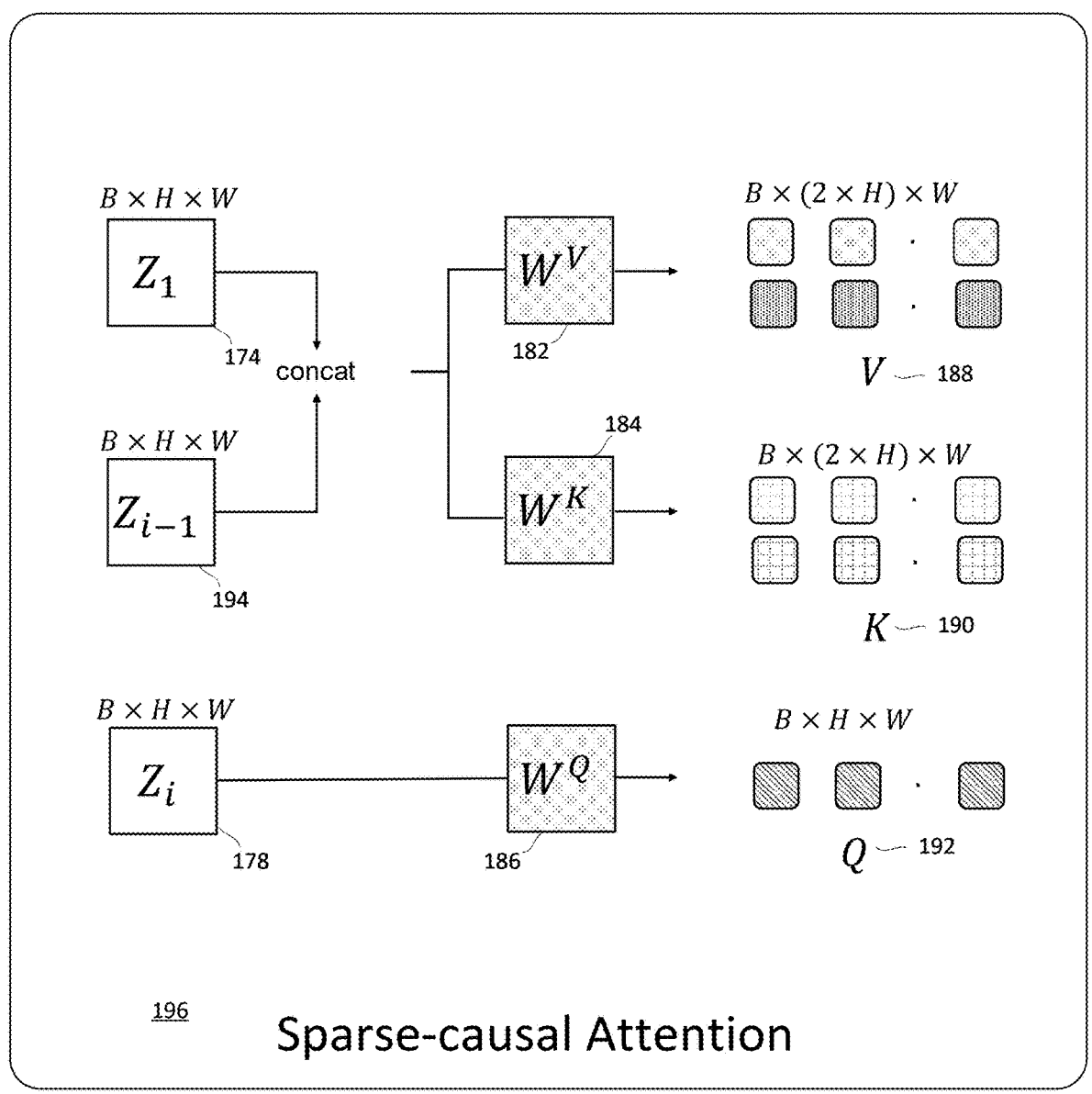
FIG. 14 is a diagrammatic view of sparse-causal attention.

FIG. 14 illustrates the sparse-causal attention mechanism, labeled as section 196. This mechanism is designed to efficiently capture temporal dependencies across frames while enforcing causality, meaning that each frame can only attend to preceding frames, not future ones, thus maintaining a directional flow of information through time.

The process begins with a set of latent feature maps from specific frames within a sequence. In this setup, the latent feature map $Z_1$ 174 represents the first frame in the sequence, while $Z_{i-1}$ 194 represents the immediately preceding frame to the current frame $Z_i$ 178. These preceding frames, $Z_1$ and $Z_{i-1}$, are concatenated along the temporal dimension as shown by the concatenation operation 180. This concatenation combines the spatial information from these earlier frames, which allows the current frame to attend only to past frames, thus preserving the causal structure of the video sequence.

Following concatenation, the combined feature map is processed by two linear projection matrices, $W^V$ 182 and $W^K$ 184. These matrices produce the value matrix V 188 and the key matrix K 190, each having dimensions B×(2×H)×W, where B denotes the batch size, H and W denote the height and width of each frame's spatial dimensions, and the temporal dimension has been doubled due to concatenation of the two past frames. These value and key matrices provide the information needed for the current frame to selectively attend to spatial features in the preceding frames.

Simultaneously, the current frame $Z_i$ 178 is processed through a separate projection matrix, $W^Q$ 186, to generate the query matrix Q 192. This query matrix has dimensions B×H×W, corresponding to the spatial dimensions of the current frame only. The query matrix enables the model to focus attention on specific regions within the current frame based on the information provided by the concatenated value and key matrices from the past frames.

The sparse-causal attention mechanism in FIG. 14 allows the model to maintain temporal coherence by focusing on dependencies with only the preceding frames, in contrast to spatio-temporal attention, which may consider all frames within a sequence. This causal restriction enhances computational efficiency by limiting attention to a smaller set of frames and ensures that each frame's output is influenced only by previous frames, reinforcing the causality in video generation and preserving the logical sequence of events across frames. This approach is particularly useful for real-time or streaming applications where maintaining causality and computational efficiency are essential.

Figure 15:
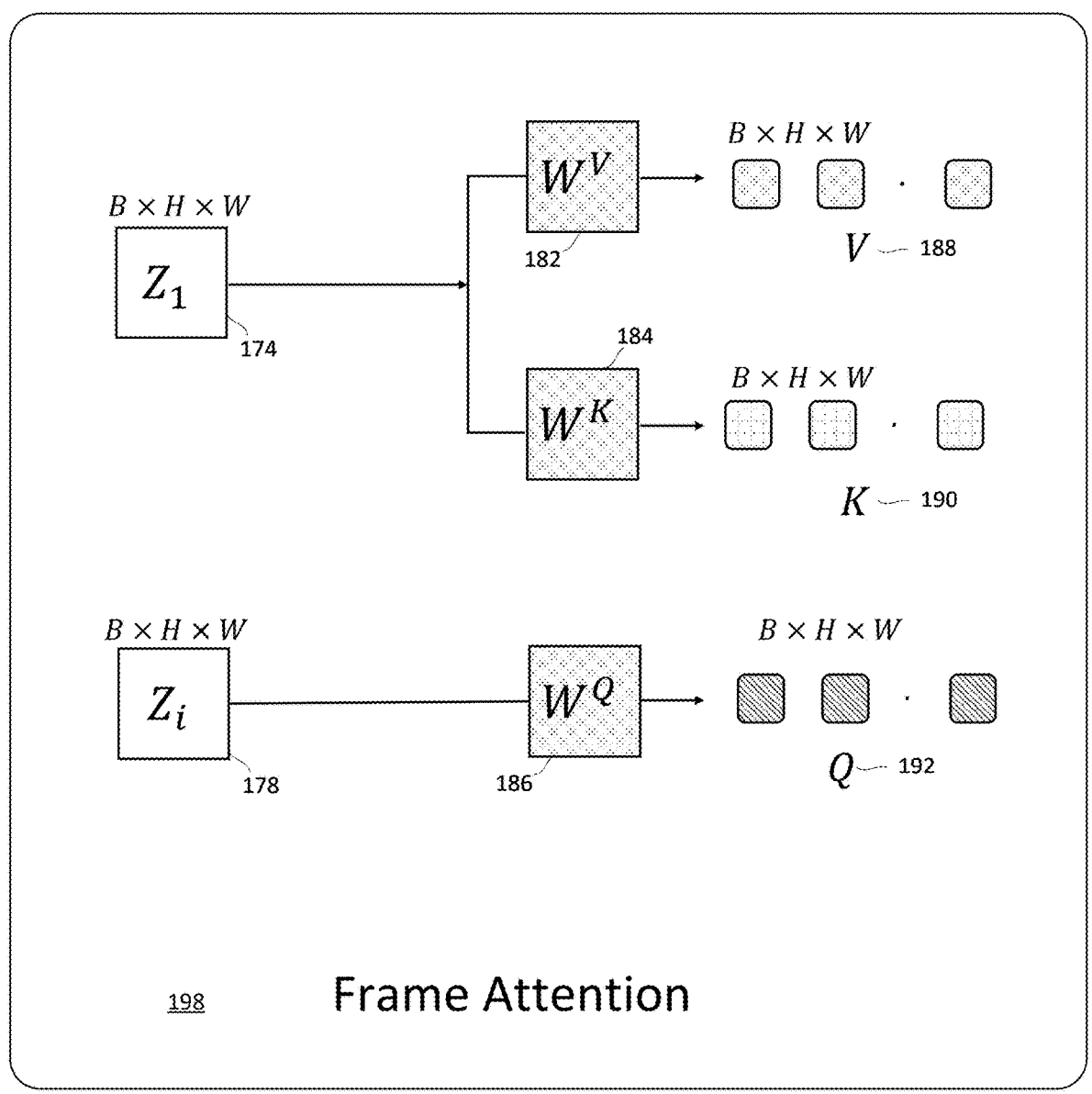
FIG. 15 is a diagrammatic view of frame attention.

FIG. 15 illustrates the frame attention mechanism, labeled as section 198, which is employed in the zero-shot generation approach to ensure spatial coherence within individual frames of a video sequence. In zero-shot generation, where each frame is generated independently based on the input prompt, there is no training or explicit temporal layer to establish consistency across frames. This means that the model must maintain coherence within each frame to create a visually consistent video without relying on frame-to-frame dependencies.

The process begins with a latent feature map $Z_1$ 174, representing the feature information of an initial frame within the sequence. This feature map undergoes projection through two linear transformation matrices, $W^V$ 182 and $W^K$ 184, which generate the value matrix V 188 and the key matrix K 190. Both V and K have dimensions B×H×W, where B denotes the batch size, and H and W represent the height and width of each frame. These matrices encapsulate spatially relevant information for the frame, enabling the model to focus on spatial relationships within the boundaries of each frame.

Simultaneously, the latent feature map of the current frame $Z_i$ 178 undergoes projection through another transformation matrix $W^Q$ 186, producing the query matrix Q 192, also with dimensions B×H×W. This query matrix interacts with the key matrix K to calculate the attention weights, while the value matrix V contains the actual feature information that the model uses to emphasize critical spatial regions within each frame.

In the zero-shot generation approach, the lack of temporal layers means that frame-to-frame coherence must be achieved indirectly, as the model cannot directly account for dependencies across frames. Here, frame attention is essential because it allows the model to independently reinforce spatial consistency within each frame, ensuring that all generated frames align with the visual requirements dictated by the input prompt. By concentrating on spatial coherence within individual frames, frame attention helps to minimize artifacts or inconsistencies in the generated video, even when each frame is generated separately without temporal guidance.

This frame-focused attention mechanism is particularly well-suited for zero-shot generation, where the emphasis is on achieving prompt-specific transformations without additional training or frame-to-frame connections. Frame attention thus supports the zero-shot approach by maintaining spatial integrity within each frame, producing a sequence of visually consistent frames that adhere to the characteristics specified by the input prompt, despite the lack of explicit temporal alignment across frames.

Figure 16:
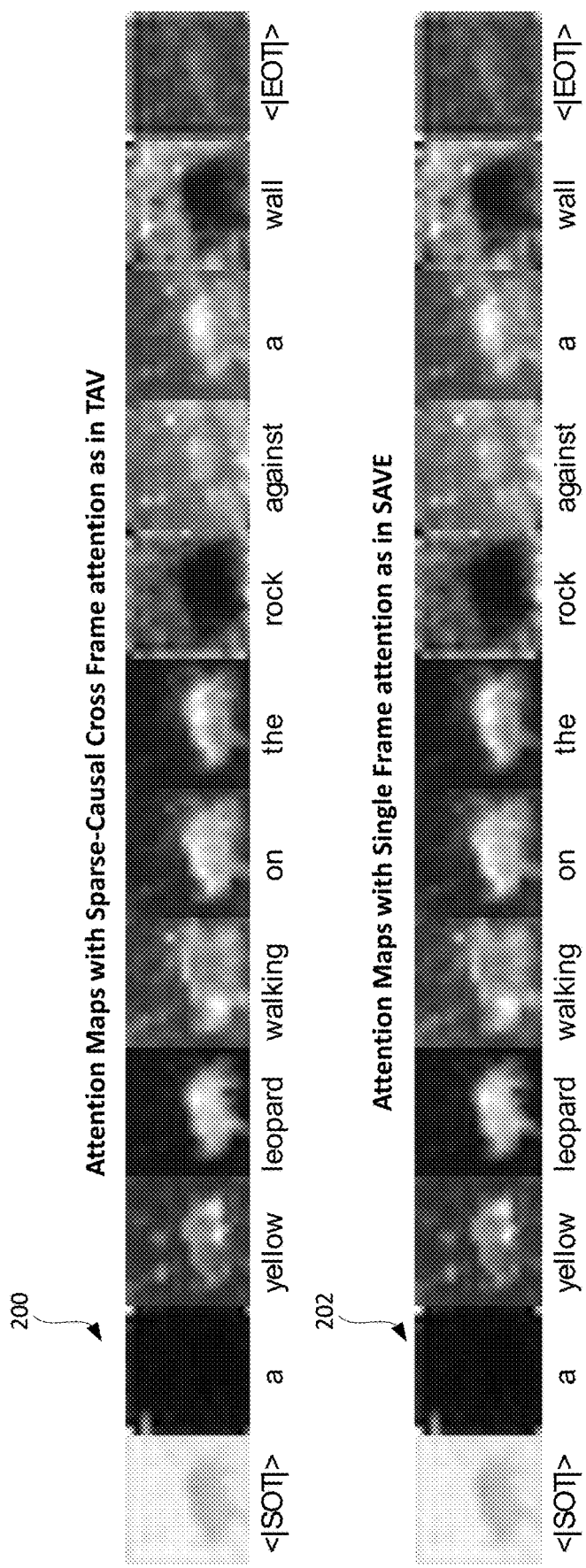
FIG. 16 shows a comparison of sparse-causal and frame attention results.
Figure 18:
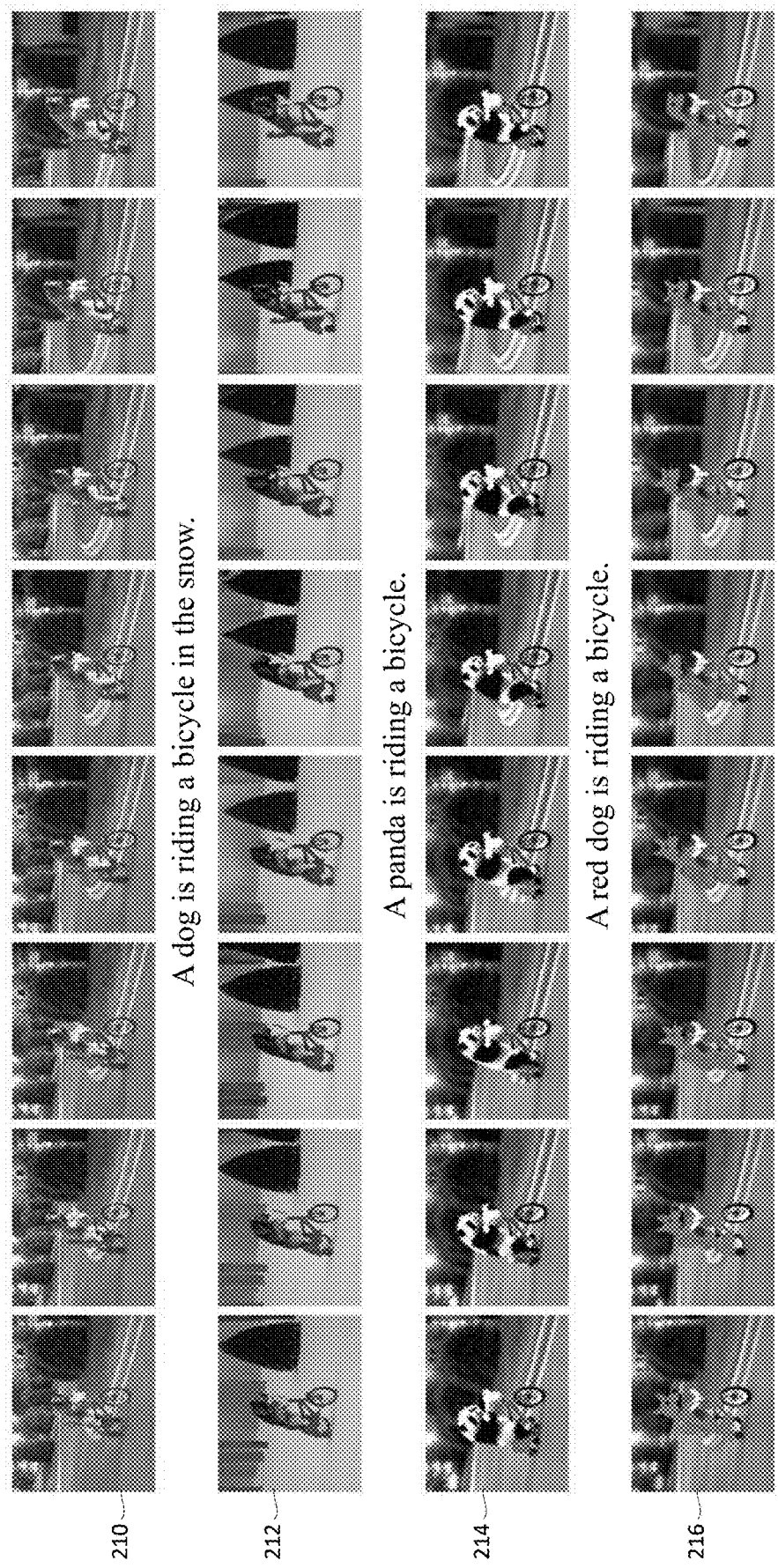
FIG. 18 shows video editing results on diverse input video using the SAVE framework disclosed herein.

As shown in FIG. 16, though both of them perform similarly, frame attention 202 (FIG. 15) requires significantly less computational resources as compared to Sparse-causal 200 (FIG. 14). FIG. 17 showcases the results of the zero-shot video generation mechanism, which uses pre-defined poses and a pre-trained T2I adapter to inject motion information frame-by-frame into the video generation process without any additional training. The figure includes several examples, each illustrating the model's ability to maintain consistent motion across frames according to distinct prompts. This setup does not employ a temporal attention layer; instead, it relies on the T2I adapter to incorporate pose-based motion, enabling the model to create coherent sequences by applying cross-frame consistency that retains pose information throughout each generated sequence.

In the first row, labeled 204, the prompt "a man in a pink shirt is dancing on the beach" results in a sequence where the model consistently depicts a figure dancing with a maintained pose against a beach backdrop. This example demonstrates the model's capacity to align with the prompt while keeping the figure's motion and setting stable across frames. The second row, labeled 206, presents the prompt "Spiderman is dancing in New York City," where the model generates a sequence in which Spiderman's pose is preserved across frames, with an urban background that reflects a New York City setting. This example shows the model's adaptability in applying distinct character prompts to its zero-shot generation, maintaining Spiderman's movement consistently. The third row, labeled 207, uses the prompt "An astronaut is dancing in the garden." Here, the model successfully renders an astronaut figure in a consistent dance pose within a garden-like setting, preserving both the astronaut's motion and the setting across frames. This demonstrates the model's effective use of the T2I adapter to handle specialized character prompts with specific environmental backgrounds. In the fourth row, labeled 208, the prompt "A girl in a blue dress is dancing on the moon" leads to a sequence depicting a figure in a blue dress, with the lunar setting maintained across frames. This example further emphasizes the model's ability to produce coherent frames that align with unique, imaginative prompts.

The final row, labeled 209, presents a failed case with the prompt "A tiger is dancing on the moon." In this instance, the model struggles to replace the human subject with a non-human animal, resulting in inconsistent frame generation. Due to the non-transferability of the human dance motion to the tiger, the generated frames display a tiger-like figure but with traces of the original human form, indicating the model's difficulty in adapting human dance poses for animals. The T2I adapter faces challenges in applying human motion to a tiger, as such movements are not naturally compatible with a tiger's anatomy and behavior. Consequently, the model inadvertently retains some human-like qualities in the tiger, as the pose and movement information do not align with the physical capabilities of a tiger.

Attention for Video Editing

The spatial self-attention mechanism capitalizes on the correlation between pixel locations in feature maps to establish similarities, while the cross-attention mechanism considers the correspondence between pixels and conditional inputs, such as text. Formally, given the latent representation $z_i$ of a video frame vi, the spatial self-attention mechanism is implemented as:

$$\text{Attention}(Q, K, V) = \text{Softmax}\left(\frac{QK^T}{\sqrt{d}}\right) \cdot V,$$

$$\text{where } Q = W^{Q}z_i, K = W^{K}z_i, \text{ and } V = W^{V}z_i.$$

Here, $W^Q$, $W^K$, and $W^V$ denote learnable matrices that project the inputs to the query, key and value components, respectively and d represents the output dimension of the key and query features. In order to enhance temporal coherence for video editing purposes, the spatial self-attention mechanism needs to be extended to the spatio-temporal domain. Various options exist for the spatio-temporal attention (STAttn) mechanism, such as full attention and causal attention, which effectively capture spatio-temporal consistency. establishes that spatio-temporal attention is inevitable for video editing where each frame $z_i$ attends to all frames in the video. A bi-directional temporal-only attention can be another option to achieve temporal consistency; however, it completely disregards spatial modeling. Therefore, to achieve spatio-temporal cohesion, the query features are computed from the spatial features of the query frame, denoted as $z_i$. On the other hand, the key and value features are computed from the spatial features across all frames, from $z_1$ to $z_k$. In this setting, the query, key, and value are mathematically written as: $Q=W^Q[z_i]$, $K=W^K[z_{1:k}]$, and $V=W^V[z_{1:k}]$. Here $W^Q$, $W^K$, and $W^V$ are the pre-trained projection weights in the self-attention layers. Causal-attention is a relatively efficient approach for video generation where each frame $z_i$ attends to all previous frames $z_{1:i-1}$ in the video. However, these straightforward choices are not viable for generating videos with an increasing number of frames, as they entail high computational complexity. Specifically, when considering k frames and N sequences for each frame, both full attention and causal attention exhibit a computational complexity of $\mathcal{O}((kN)^2)$.

To generate a higher number of frames and mitigate the computational cost, use of a sparse version of the causal attention mechanism is employed. In this approach, attention matrices are computed between the frame $z_i$ and the two preceding frames, $z_1$ and $z_{i-1}$ resulting in reduced computational complexity of $\mathcal{O}((2\ mN)^2)$. Specifically, the query feature is derived from frame $z_i$ while the key and value features are obtained from the first frame $z_1$ and the former frame $z_{i-1}$, respectively. The attention operation Attention (Q, K, V) is then implemented with the query, key and value mathematically written as $Q=W^Q[z_i]$, $K=W^K[z_{1:k}]$, and $V=W^V[z_{i:k}]$. Simple frame attention is sufficient for DDIM inversion editing methods as the reversed latent features can capture the temporal information, and therefore attention with $Q=W^Q[z_i]$, $K=W^K[z_0]$, and $V=W^V[z_0]$ can achieve the desired editing performance.

Figure 19:
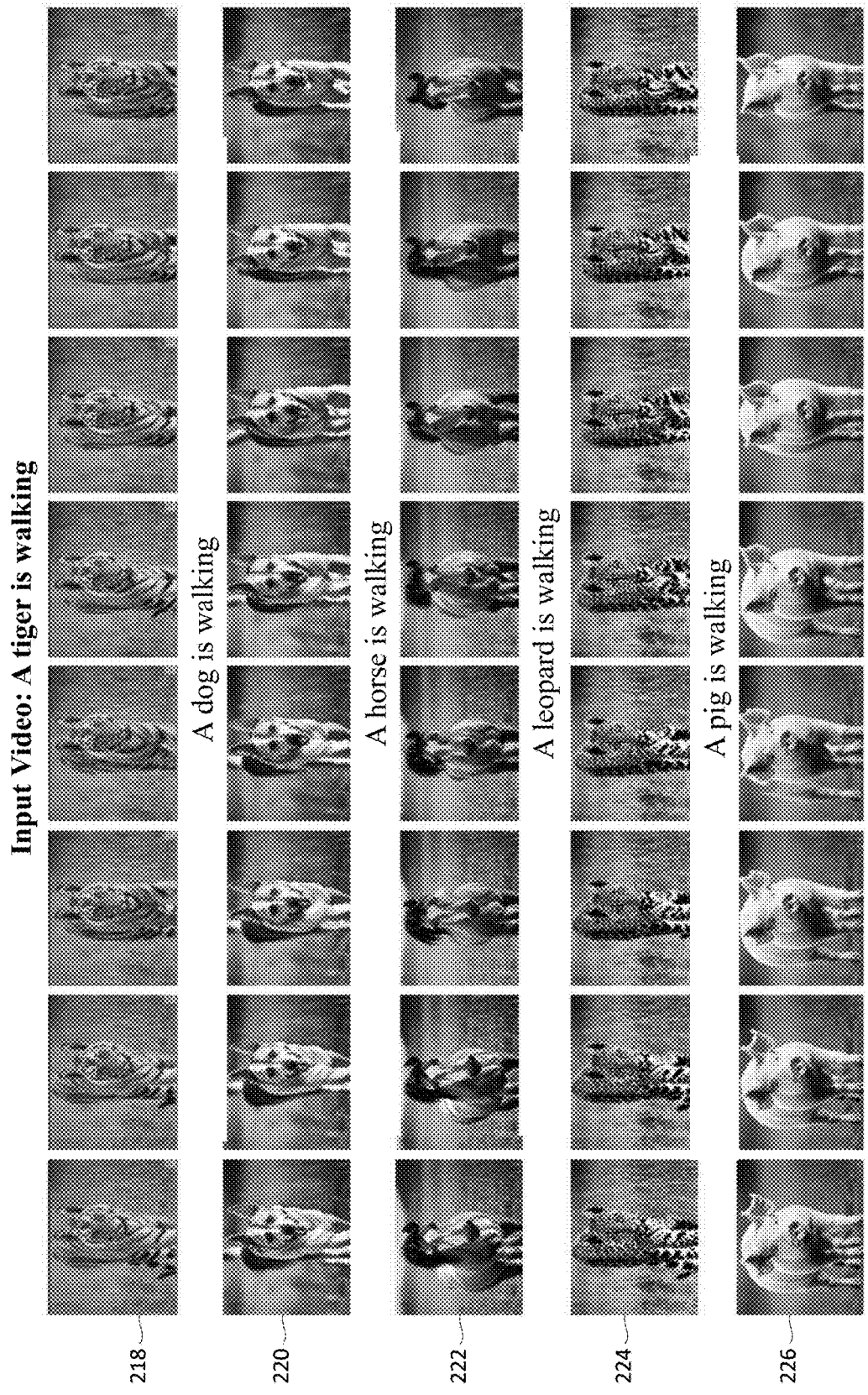
FIG. 19 shows additional video editing results from editing prompts.

FIG. 19 demonstrates the use of the SAVE framework to adapt an input video of a tiger walking, translating the tiger's motion pattern to various other animals. In this case, the SAVE framework is applied to retain the original motion dynamics of the tiger across frames while altering the subject's appearance based on different prompts. The SAVE framework enables selective adjustments in the latent space to control both motion and visual features without requiring re-training for each target animal.

The first row, labeled 218, shows the original input video titled "A tiger is walking," providing a baseline for the walking motion that the SAVE framework will replicate in subsequent rows for different animals. In the second row, labeled 220, the prompt "A dog is walking" guides the SAVE framework to modify the tiger's appearance to resemble a dog while preserving the walking motion. Through the SAVE framework's spectral shift mechanism, the model maintains the dog's consistent gait across frames, adapting the tiger's movements into a natural dog-like stride.

The third row, labeled 222, is generated using the prompt "a horse is walking." Here, the SAVE framework translates the tiger's walking motion to a horse, adjusting the visual details to match the horse's unique body structure while keeping the motion coherent across frames. The fourth row, labeled 224, with the prompt "a leopard is walking," shows the transformation of the tiger into a leopard. Given the visual similarities between a tiger and a leopard, the SAVE framework smoothly adapts the motion and physical details to match a leopard's features, demonstrating the model's versatility in handling visually similar animals with slight differences in appearance.

Finally, the fifth row, labeled 226, uses the prompt "a pig is walking." In this sequence, the SAVE framework maintains the original walking motion while transforming the tiger into a pig. Despite the anatomical differences between a tiger and a pig, the SAVE framework preserves the coherence of the walking motion while adapting the appearance to match the distinctive shape and movement style of a pig.

Figure 20:
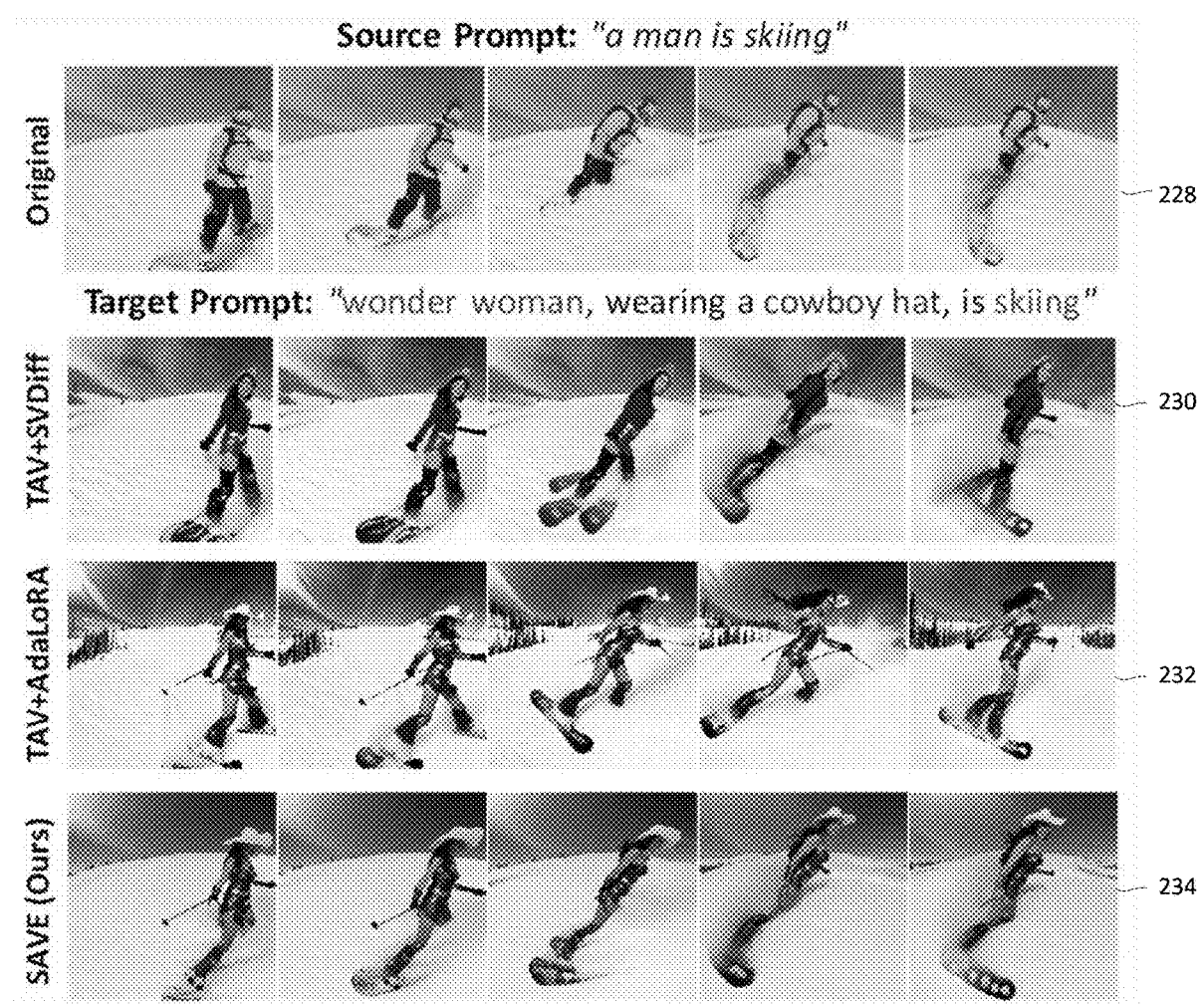
FIG. 20 shows qualitative comparisons of SAVE against SVDIff and AdaLoRA.

FIG. 20 provides a qualitative comparison between different editing methods—TAV+SVDiff, TAV+AdaLoRA, and the SAVE framework—in the context of video editing driven by a target prompt. The source prompt, "a man is skiing," is shown in the top row, labeled 228, representing the original video frames. The target prompt, "wonder woman, wearing a cowboy hat, is skiing," specifies the desired transformations, including character, attire, and additional details like the cowboy hat.

In the first comparison row, labeled 230, TAV+SVDiff attempts to apply the target prompt's modifications. While it partially changes the appearance to resemble "wonder woman," it fails to capture all the details specified in the prompt. Notably, the dress is inaccurate, and the cowboy hat is missing across the frames, demonstrating that SVDiff struggles to apply all elements of the target prompt consistently.

The second comparison row, labeled 232, shows the results of TAV+AdaLoRA. This approach performs better in including the cowboy hat, but the hat's appearance is inconsistent across frames, and the transformation lacks coherence. Additionally, the background and textures diverge from the original video, with visible changes that do not align with the initial snowy landscape. This inconsistency suggests that AdaLoRA has difficulty preserving background and spatial coherence while editing multiple aspects specified by the prompt.

The final row, labeled 234, illustrates the results generated by the SAVE framework (labeled "Ours"). SAVE successfully applies all aspects of the target prompt, rendering "wonder woman" with the correct dress, along with a consistent cowboy hat in each frame. The background remains coherent and faithful to the original snowy setting, and the textures are preserved, allowing the edited video to maintain spatial and temporal consistency. This result highlights SAVE's capability to integrate detailed, multi-element modifications with high fidelity, effectively maintaining both background coherence and prompt-driven transformations across frames.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

AdaLoRA means an adaptive low-rank adaptation method that enhances fine-tuning efficiency of pre-trained large models, particularly in the context of video-to-video translation or other generative tasks. AdaLoRA dynamically adjusts the rank of parameter updates, concentrating on key layers with high importance while minimizing computational overhead on less impactful layers. This selective adaptation helps in achieving more effective fine-tuning with reduced resource consumption, making it especially useful for applications where computational efficiency is critical without compromising on output quality.

Adaptation means the process of modifying a pre-trained neural network model to perform a new, related task while preserving the core structure of the model. In this case, adaptation involves adjusting a text-to-image (T2I) diffusion model so it can generate and edit video content based on text prompts, a task requiring temporal coherence and spatial consistency across video frames. Unlike full re-training, which is computationally intensive, adaptation modifies only select parameters, such as the singular values, to integrate motion and continuity without compromising the model's base structure. This method leverages spectral shifts to efficiently bridge the gap between static image generation and dynamic video editing.

Alignment means the precise matching of visual elements in generated media to specified text descriptions or prompts, ensuring that content accurately reflects the intended attributes described by the user. In SAVE, alignment involves linking text-based instructions with specific objects or scenes within each video frame. This alignment is achieved by controlling attention maps and applying the spectral shift regularizer to focus on key elements that correspond to the prompt. Proper alignment allows for coherent modifications across frames, maintaining the relevance of visual changes to the input description, especially during complex tasks like object replacement and attribute editing.

AT&T dataset means a dataset originally developed by AT&T for facial recognition research, which consists of grayscale images of various subjects captured under controlled conditions. This dataset is commonly used in machine learning for training and testing algorithms related to image recognition, particularly for studies in pattern recognition and human-computer interaction. The AT&T dataset includes multiple images per subject, allowing for experiments in image consistency, variance, and recognition accuracy across different expressions or orientations of the same subject.

Attention maps mean visual representations that highlight regions of interest in generated content based on the model's focus during processing. These maps show where the model "looks" when attempting to align features with a given prompt. In SAVE, attention maps are used to manage cross-frame consistency and control object transformations by guiding the model to emphasize areas relevant to the text input while preserving less critical areas. Attention maps help ensure that edits-such as altering an animal type in a video—are isolated to the targeted subject and do not affect unrelated regions.

Background perseverance means maintaining the consistency of the background elements in a video while allowing the specified objector subject to undergo changes as per the editing prompt. In the SAVE framework, background perseverance is crucial for ensuring that edits do not alter the overall setting of the video, such as altering only the color or species of an animal while keeping the surrounding environment intact. This is achieved through controlled attention that focuses transformations on the primary subject and leaves non-targeted areas unchanged, supporting coherent frame-by-frame continuity.

Classifier-free guidance scale (scfg) means a hyperparameter controlling the extent to which the editing prompt influences the final output. An scfg of 1 maintains the original video content, while values greater than 1 apply stronger adherence to the editing prompt, allowing for more pronounced changes in alignment with the prompt. The scfg parameter is particularly important during inference, where adjusting it helps achieve a balance between staying close to the original content and applying the desired modifications prompted by the text.

Clean latents mean data representations that are clear of noise and have been processed to focus solely on the key characteristics of the input. In diffusion-based models like SAVE, clean latents serve as the refined foundational data that are manipulated to generate video frames. These latents are initially obtained by encoding the input data and then are gradually diffused (noised) and denoised through iterative steps, allowing the model to produce outputs that retain essential visual traits aligned with the input prompt.

Coarse class token means a generalized representation that captures broader features of a class or object, used as an initial reference point in model training and editing tasks. In SAVE, coarse class tokens provide a foundational association between text prompts and video objects, creating a loose mapping that guides further refinement. This token helps the model establish initial correspondences, which can then be refined for specific attributes, ensuring that broad edits retain alignment with the intended object categories in the video.

Coarse matching means the initial alignment process where the model connects broad aspects of the prompt with corresponding elements in the video frames. This level of matching serves as a preliminary association that is then refined during fine-matching to achieve precise, detailed alignment. Coarse matching allows SAVE to create a rough structure based on the input prompt, providing a foundational layer that subsequent processing can build upon for accurate representation of prompt-specific details.

CogVideo means a large-scale text-to-video (T2V) generation model developed for creating videos from text prompts. Unlike traditional T2I (text-to-image) models, CogVideo integrates temporal modeling techniques to maintain coherence across frames, translating static image-generation models into dynamic video output. It is trained on multimodal datasets, allowing it to handle complex prompts that involve actions or scene changes. CogVideo aims to streamline T2V generation by leveraging deep learning advancements in both text-based and video-based modalities.

Contrastive Language-Image Pre-training (CLIP) text encoder means a neural network component that transforms text into a representation compatible with image or video features, allowing the model to align descriptions with visual content. The CLIP encoder interprets text prompts as vectors within a shared embedding space, which the SAVE model can then use to modify video frames according to the provided description. By converting language into a structured form, the CLIP encoder enables the model to apply textual guidance effectively in video generation and editing tasks.

Cross-attention (CA) maps mean attention mechanisms used to relate elements in one data domain (e.g., text prompts) to corresponding elements in another (e.g., video frames). In SAVE, cross-attention maps enable the model to match specific features of the video content with descriptive text features, ensuring that changes directed by the prompt are accurately applied across frames. These maps support selective focus on specific objects or actions while maintaining coherence with the overall video context.

Deterministic Denoising Diffusion Implicit Models (DDIM) inversion means a reverse process that reconstructs clean video frames from noisy latent representations. During video editing, DDIM inversion is used to guide transformations by first diffusing video frames into latent space and then gradually denoising them in line with the desired prompt. This method ensures that edits propagate smoothly across frames and that generated content aligns with the input conditions while preserving temporal consistency.

Diffusion model means a generative model that creates data by learning to reverse a progressive noise-adding process, enabling it to produce complex distributions and detailed outputs, such as images or video frames. In the context of SAVE, the diffusion model is adapted to handle video data by leveraging spectral decomposition and attention mechanisms to ensure frame coherence and prompt alignment. The model operates by incrementally refining noisy latent representations to achieve high-quality video content based on textual guidance.

DNN generator means a deep neural network designed to synthesize media content, typically images or videos, from latent data representations. In SAVE, the DNN generator uses learned patterns to create or edit video frames based on textual input, applying adjustments through processes such as spectral shift. By focusing on specific latent space elements, the DNN generator efficiently translates abstract model representations into concrete, visually consistent output frames aligned with the editing prompt.

Eigenvalues mean the values representing the magnitude of variation in a specific direction within a mathematical transformation. In SAVE, eigenvalues result from the spectral decomposition of model weights and reflect the strength of various model parameters. Adjusting eigenvalues without altering eigenvectors allows SAVE to apply fine-grained control over video editing effects while minimizing computational overhead and maintaining the core model structure, critical for rapid adaptation.

Fine-tuning means the selective adjustment of model parameters, often on a subset of data, to optimize performance on a specialized task. For SAVE, fine-tuning involves tweaking only the singular values in the pre-trained T2I model to adapt it for T2V editing. This targeted approach reduces the need for extensive retraining while enhancing the model's ability to produce coherent video frames that respond accurately to input prompts.

Frame consistency means maintaining uniformity across sequential video frames to avoid visual discontinuities or mismatches that may distract from the continuity of the video's narrative. In the context of SAVE, frame consistency is critical for achieving a seamless video edit where object and background modifications, prompted by text inputs, must align across frames. For instance, changing the color of an object or replacing one object with another requires each frame to reflect this change accurately, avoiding any flickering or unintended alterations in adjacent frames. Frame consistency is accomplished in SAVE by employing controlled cross-attention mechanisms and utilizing spectral shift regularization, ensuring that changes to the video output are propagated uniformly. This adherence to frame coherence allows for smoother transitions and supports high-quality video edits that appear natural and professionally rendered, particularly in instances of zero-shot editing where modifications span the entirety of the video sequence.

Gershgorin circle means a mathematical construct used to approximate the location of eigenvalues within complex matrices by identifying circular regions in the complex plane that bound these values. In spectral decomposition, the Gershgorin circle theorem provides a means to bound the eigenvalues of a matrix based on the entries within each row or column, effectively aiding in the constraint of eigenvalue adjustments. In SAVE's context, Gershgorin circles are applied to control the extent of spectral shifts, particularly when fine-tuning singular values in a way that maintains the stability of the model's output while minimizing computational strain. By ensuring that adjustments fall within calculated bounds, this approach prevents extreme deviations in spectral values, which could otherwise destabilize the coherence and fidelity of the video output. This theorem thus supports the constrained optimization required for efficient, targeted model adaptation within the SAVE framework, especially when balancing new content integration with baseline video structure.

Inversion means the process of reversing a transformation applied to a model or data, often used to reconstruct original content or generate latent data that matches a specified prompt. Within SAVE, inversion is associated with DDIM (Deterministic Denoising Diffusion Implicit Models) and involves transforming noisy latent representations back into structured, visually coherent video frames. During editing, inversion helps control how the spectral shifts and attention adjustments map onto video frames, supporting precise alignment with the prompt's details. This process allows SAVE to translate abstract latent modifications into refined, high-quality video outputs, bridging the gap between the model's internal adjustments and the user's intended visual outcome. By employing inversion in conjunction with spectral shift techniques, SAVE achieves more efficient content transformation, enabling the rapid generation of edited frames that retain temporal and spatial coherence with the original video while meeting the editing prompt's requirements.

Latent space representation means a lower-dimensional encoding of data that captures essential patterns and features while omitting redundant details. In neural networks, latent spaces represent the model's internal understanding of data, structured in a way that preserves key attributes needed for generation or classification tasks. SAVE uses latent space representations to streamline the video editing process by reducing high-dimensional video frames into manageable representations that can be manipulated efficiently. This latent encoding simplifies the application of transformations, such as spectral shifts, enabling the model to focus on specific aspects like object attributes or spatial arrangements while preserving temporal continuity. By operating within this abstract space, SAVE minimizes resource demands, allowing it to perform complex edits based on textual prompts without excessive computational cost. Latent representations also facilitate multi-frame coherence, as the model's internal structures maintain consistency across frames, crucial for seamless video outputs.

Local content means specific regions or elements within a video frame that are the primary focus of an editing operation, as opposed to the entire frame or background. In SAVE, local content typically involves objects or areas designated for modification, such as changing the color of an animal or replacing one object with another based on the text prompt. Through attention maps and spectral shifts, SAVE selectively targets local content, ensuring that alterations are confined to the relevant areas without disrupting the surrounding context. This targeted approach allows the model to make precise changes while preserving frame coherence and background consistency, which are vital for high-quality video edits. By isolating local content, SAVE reduces the risk of unintended artifacts or inconsistencies, making it an efficient tool for real-time or batch video editing tasks where precision is key to maintaining video quality and relevance to the prompt.

Low-rank adaptation (LoRA) means a parameter-efficient method for adapting a pre-trained model by introducing additional low-dimensional parameters that capture essential variation without altering the original high-dimensional weights. LoRA works by decomposing the weight updates into lower-rank matrices, which allow for adjustments in specific directions relevant to the adaptation task. In SAVE, LoRA principles guide the spectral shift process, which focuses on selectively modifying singular values to accommodate new video editing tasks while keeping the model's core structure intact. By utilizing a low-rank approach, SAVE achieves efficient adaptation, enabling it to respond to text prompts for video editing with minimal computational overhead. This targeted parameterization maintains the model's generalizability and coherence across frames, facilitating real-time applications. LoRA-based adaptations thus support SAVE's ability to operate within resource constraints while retaining fidelity to the input prompt, making it an optimal choice for adaptive, text-driven video generation and editing.

MAV means "Multi-Agent Video," referring to systems or datasets involving multiple agents or objects interacting within a video. MAV frameworks are used to analyze, model, and predict the behavior of multiple agents, such as humans, animals, or vehicles, in dynamic environments. This concept is commonly applied in areas like autonomous driving, surveillance, and robotics, where understanding the interactions between multiple moving entities is crucial for scene interpretation and decision-making.

Multi-object editing means the capacity to modify multiple elements within a video sequence independently based on different parts of the prompt, allowing complex edits that involve several distinct objects. In SAVE, multi-object editing leverages attention maps and spectral shift techniques to apply localized transformations to each specified object without interference from adjacent edits. This enables the model to address prompts that require different attributes for multiple entities—such as changing the color of one object while replacing another with a different species—while maintaining coherence across frames. Multi-object editing is supported by attention mechanisms that isolate individual subjects within the frame and spectral regularizers that control how each object is transformed. This ability to edit multiple elements simultaneously expands SAVE's functionality beyond simple, single-object modifications, allowing for intricate compositions in applications like animation, video personalization, and targeted content generation where nuanced, multi-part transformations are needed.

Realistic quality means the model's ability to produce video frames that appear visually credible and natural, closely resembling real-life scenes or well-constructed CGI. For SAVE, achieving realistic quality is a key outcome when adapting T2I models for video tasks, as the model must produce frames that align smoothly with prior and subsequent frames, minimizing perceptible artifacts. Through the application of controlled spectral shifts and attention mechanisms, SAVE enhances detail precision in target areas while preserving the overall texture and lighting consistency necessary for a lifelike appearance. Realistic quality is further reinforced by frame consistency and background perseverance, ensuring that objects remain cohesive across frames while adapting to prompt-specific modifications. This attribute is particularly important in applications requiring seamless video output, such as video production, virtual reality, and digital marketing, where realistic quality directly influences viewer engagement and the perceived fidelity of the edited content.

Regularizer means a method or parameter that enforces constraints on a model's behavior to improve stability, reduce overfitting, or guide specific transformations. In SAVE, a spectral shift regularizer is used to limit the degree of change applied to the model's singular values, especially for large singular values that influence major features in the video frames. This regularization process ensures that while fine adjustments can be made for prompt-specific modifications, the model's core characteristics remain consistent, preventing excessive deviation from the original pre-trained parameters. The regularizer thus provides a balance, allowing flexibility in editing specific video elements while maintaining fidelity to the overall video structure. Regularization in SAVE is essential for managing how new content is integrated across frames, enabling edits to appear coherent and maintaining alignment with the initial frame attributes, which is critical for high-quality and resource-efficient video editing.

Sampling means the process of generating outputs by iteratively drawing from probability distributions within a diffusion model, gradually refining latent noise representations into structured video frames. In the SAVE framework, sampling occurs within a controlled setting where initial noisy representations undergo systematic transformations toward the target output, guided by the text prompt and governed by parameters such as scfg. During sampling, spectral shifts are applied in each iteration to align the video output with the text instructions, using attention mechanisms to focus on relevant content while preserving frame consistency. This iterative sampling process enables the model to transition from abstract latent forms to refined, visually accurate frames, with adjustments applied selectively to ensure that each frame contributes to the prompt-driven narrative. Efficient sampling in SAVE is integral to achieving smooth, temporally coherent video sequences that meet the text-based requirements without straining computational resources.

Single frame attention means an attention mechanism that limits focus to each frame independently, rather than considering connections with other frames. In SAVE, single frame attention is employed to reduce computational load while still achieving high alignment with the text prompt within individual frames. This method simplifies the video generation process, as each frame's features are adjusted without continuous cross-frame influence, allowing for precise modifications to localized content. Single frame attention is particularly useful in scenarios where modifications are isolated to specific frames or where inter-frame continuity is less critical. By limiting attention scope to each frame, SAVE balances computational efficiency with prompt accuracy, making single frame attention a resource-efficient alternative to more complex temporal attention mechanisms when generating or editing video content based on user-defined attributes.

SOTA means "State of the Art," referring to the highest level of performance achieved in a specific field, typically in machine learning or artificial intelligence research. SOTA models represent the best-performing algorithms, architectures, or methodologies at the time of evaluation, often setting benchmarks for future developments. In the context of T2V models, achieving SOTA implies excelling in aspects like video quality, temporal coherence, and prompt adherence, surpassing previously established models in those metrics.

Sparse-causal cross-frame attention means an attention approach that selectively incorporates past frame information into the current frame's editing process, focusing only on a limited set of preceding frames. In SAVE, this form of attention achieves temporal coherence without the full computational complexity of examining all frames. By restricting attention to only the most relevant preceding frames, sparse-causal attention captures necessary motion and progression in video editing while avoiding unnecessary resource expenditure. This allows SAVE to produce smooth, temporally aligned videos by connecting each frame's content to key elements from previous frames, supporting prompt-specific modifications that require continuity over time. Sparse-causal cross-frame attention is especially valuable in tasks where partial frame history provides sufficient context, such as gradual transformations, making it a practical balance between efficiency and accuracy in maintaining frame-to-frame coherence.

Special token means a unique identifier or placeholder within a neural network that represents specific content categories or prompts, enabling targeted transformations in response to these designated items. In SAVE, special tokens are used to anchor attention and editing focus on particular objects or regions, ensuring that prompt-related modifications are confined to intended areas without spillover into unrelated regions. For example, when editing an animal within a frame, a special token might designate that animal as the target, allowing SAVE to apply modifications exclusively to it. This selective focus minimizes unintended changes, preserving the surrounding context. Special tokens thus act as reference points within the video editing process, allowing precise, localized adjustments in alignment with the prompt, which is essential for multi-object editing and maintaining high fidelity in edited video outputs.

Spectral decomposition means a mathematical operation that breaks down a matrix into its eigenvalues and eigenvectors (or singular values and singular vectors in the case of singular value decomposition, SVD). This process reveals the matrix's intrinsic structure by identifying its key directional components. In SAVE, spectral decomposition is applied to the neural network's weight matrices to isolate and adjust only specific singular values, which correspond to targeted elements within the model's parameter space. By focusing on these components, spectral decomposition allows SAVE to apply controlled, prompt-driven modifications without altering the entire network, which maintains computational efficiency. This selective adaptation process ensures that transformations align with the desired output while preserving the original model's structural integrity, allowing for resource-conscious video edits that respond precisely to text prompts.

Spectral shift means the targeted adjustment of singular values within a neural network's weight matrices, achieved through spectral decomposition, to apply specific modifications while leaving the core structure largely intact. In SAVE, spectral shift allows the model to modify only the necessary attributes related to the editing prompt, focusing on particular singular values that govern the intensity or relevance of certain features. This selective tuning avoids the need to reconfigure the entire model, enabling rapid and efficient video editing. Spectral shift is particularly suited for tasks requiring subtle adjustments or changes in visual attributes, as it applies changes with precision, isolating edits to designated areas without disturbing the overall model configuration. This approach supports SAVE's goal of maintaining efficiency in resource usage and coherence in output quality, making it ideal for real-time or large-scale video editing applications.

Spectral shift regularizer means a constraint applied during spectral shift to control the degree of modification for each singular value, limiting adjustments to ensure coherence with the original model. In SAVE, the spectral shift regularizer differentiates between large and small singular values, imposing stricter bounds on the larger values that shape primary features while allowing more flexibility for smaller values associated with finer details. This controlled adaptation maintains the model's stability and prevents drastic changes that could result in visual inconsistencies or frame misalignment. The spectral shift regularizer thus enables SAVE to execute prompt-based modifications with precision, supporting high-quality, temporally consistent video outputs without overextending computational requirements, essential for applications requiring both adaptability and preservation of baseline video structure.

Subject separation means the model's ability to isolate primary subjects from other elements within a video frame, enabling selective modifications without affecting non-target areas. In SAVE, subject separation is achieved using attention maps and special tokens that help focus adjustments on the main object specified in the prompt. For instance, if the prompt specifies altering an animal within a landscape, subject separation ensures that only the animal is affected, leaving the background untouched. This targeted editing capability allows for high-precision modifications aligned with user instructions, maintaining frame consistency and avoiding unintended spillover effects. By reinforcing subject boundaries, SAVE supports clean, specific edits while preserving the integrity of the surrounding context, a feature essential for professional-grade video content creation.

SVDiff means a specialized method that combines Singular Value Decomposition (SVD) with diffusion-based models, typically to enhance fine-tuning and adaptation of large generative models. SVDiff reduces computational demands by decomposing large matrices in model layers, focusing updates on the most significant components. In T2V applications, SVDiff facilitates efficient fine-tuning on video datasets without extensive retraining, enabling rapid model adaptation for specific tasks or domains while maintaining high-quality output.

TAV means "Text-Aligned Video," a model or technique focused on generating or editing video sequences to align closely with a given text description. TAV models interpret textual prompts and apply transformations to video frames to reflect the specified changes while maintaining coherence across frames. This approach is used in applications like video editing, content creation, and augmented reality, where precise alignment between text descriptions and video output is required. TAV leverages multimodal training data and neural networks capable of cross-modal understanding to interpret language and apply corresponding visual changes in video sequences.

Temporal layer initialization means the process of configuring temporal layers in a neural network to handle sequential data, facilitating frame-to-frame coherence in video generation or editing. In SAVE, temporal layer initialization ensures that added layers are properly synchronized to manage the time-based relationships across frames. Unlike static models, which focus on single images, video models require continuity that respects the chronological order of frames. Temporal layer initialization allows SAVE to preserve these temporal dependencies, enabling smooth transitions and consistent frame modifications that align with the prompt. This setup is essential for creating video edits that flow naturally, allowing the model to capture movement and progression as dictated by the video's inherent timeline, supporting the coherent evolution of scenes or actions over time.

Temporal modeling means the design and application of model structures that account for the time-based progression of data across video frames. In SAVE, temporal modeling is critical for ensuring that transformations applied in response to a text prompt are not only spatially accurate but also temporally aligned. This modeling approach uses mechanisms like cross-frame attention and frame-to-frame consistency checks to maintain the logical flow of edits across frames. For example, changing an object's color should not abruptly revert or vary in subsequent frames. Temporal modeling in SAVE helps preserve continuity, applying spectral shifts and attention adjustments in a way that aligns with the natural motion and evolution of video content, supporting seamless transitions and avoiding temporal artifacts.

Text-to-image (T2I) diffusion model means a neural network trained to generate images from textual descriptions, learning the underlying data distribution conditioned on text prompts. In SAVE, a T2I model serves as the foundation for video editing, but it is adapted to manage temporal coherence across multiple frames. While T2I models excel at single-frame generation, video editing demands temporal alignment and consistency across frames, which SAVE achieves by introducing temporal layers and attention mechanisms. By leveraging spectral shifts to modify only select parameters, SAVE transforms a T2I model into a video-capable framework that responds to text prompts without extensive retraining. The adapted T2I model in SAVE ensures that visual details, such as color and shape, align across frames, translating the model's static image generation capabilities into dynamic, prompt-driven video generation and editing.

Text2LIVE means a technique for real-time video editing and generation based on textual prompts. Text2LIVE leverages deep learning architectures to process text inputs and apply them dynamically to video frames, creating interactive editing capabilities that allow users to alter visual aspects of videos through simple text commands. This method is designed to maintain consistency across frames, producing seamless transitions and edits without disrupting the original video's temporal coherence. Text2LIVE is especially useful in content creation tools where live video modifications are required, enabling more intuitive and flexible editing workflows.

Text-to-video (T2V) model means an adapted T2I model extended to generate or edit video content based on textual prompts, with specific provisions for temporal alignment across frames. Unlike T2I models, which focus on static images, T2V models incorporate temporal layers and attention mechanisms that allow them to handle motion and maintain consistency over time. In SAVE, the T2V model operates through spectral shifts and temporal attention layers, translating text prompts into continuous, frame-by-frame transformations. This adaptation preserves the structural integrity of the original T2I model while expanding its scope to support video-specific needs. SAVE's T2V framework thus combines spatial detail retention with temporal coherence, enabling high-quality video edits in response to descriptive prompts and providing a foundation for applications like animation, video production, and content customization.

Text encoder means a component within a neural network that converts textual descriptions into vector representations, aligning them with visual features for conditional generation or editing tasks. In SAVE, the text encoder translates prompts into a form that the video model can interpret, allowing it to modify content based on the prompt's instructions. This encoding process uses embeddings to capture semantic information from the text, creating structured vectors that guide attention mechanisms and spectral shifts within the model. The text encoder in SAVE ensures that the nuances of the prompt, such as object type or color specifications, are preserved during the video editing process. By embedding text in a shared space with visual features, the encoder provides a coherent reference point for transforming frames in alignment with the prompt, supporting accurate and prompt-driven video edits.

Textual alignment means the precise correspondence between elements specified in a text prompt and the visual changes applied to a video. In SAVE, textual alignment is achieved by mapping encoded text features to the relevant video content through cross-attention mechanisms and spectral shift regularizers. This process ensures that every frame accurately reflects the described modifications, such as replacing objects or adjusting colors. Textual alignment is crucial for creating video outputs that match the user's expectations, as it enables the model to apply edits in a way that is both contextually accurate and temporally consistent. By focusing on alignment, SAVE achieves high fidelity between prompt details and frame content, essential for applications like advertising, media production, and interactive video where precision is necessary for effective visual storytelling.

Tunable parameters mean the specific components within a neural network that can be adjusted during fine-tuning to improve the model's performance on a given task. In SAVE, tunable parameters are limited to the singular values derived from spectral decomposition, allowing targeted modifications without extensive computational demand. This approach reduces the number of parameters that need adjustment, focusing only on those essential for adapting the model to video editing tasks based on text prompts. By tuning only critical parameters, SAVE maintains the efficiency and stability of the model, enabling rapid response to prompts with minimal interference in the model's baseline structure. This selective tuning supports scalability and adaptability, making it feasible to handle various editing tasks across different applications without requiring full model retraining.

Tune-A-Video (TAV) means a method in text-to-video generation that involves one-shot tuning of image diffusion models for video tasks by adapting image-generation techniques. TAV provides a baseline approach for T2V conversion but often requires significant computational resources, as it lacks spectral shift optimizations and regularizers present in SAVE. Unlike SAVE, which focuses on resource efficiency and precision through controlled spectral shifts, TAV relies on broader, parameter-intensive adjustments, making it less suitable for real-time or resource-limited applications. SAVE builds upon concepts in TAV by applying spectral shifts and low-rank adaptations, reducing computational cost while achieving high fidelity in video content aligned with text prompts. TAV thus serves as a point of reference for comparing SAVE's enhanced efficiency and selective adaptation capabilities in the T2V domain.

Video-P2P means a model or framework focused on video point-to-point translation, enabling transformations between two different visual states within video sequences. Video- P2P models are typically used to adapt scenes by altering specific characteristics, such as style, lighting, or object properties, in a manner that is consistent across frames. The model learns to map features from an input video to an output with the desired transformation, making it useful in applications like video style transfer, visual effects, and virtual reality. Video-P2P frameworks often integrate generative adversarial networks (GANs) or similar architectures to achieve realistic and coherent transitions.

Zero-shot video generator means a model capable of generating video content without requiring task-specific fine-tuning or extensive training on large text-video datasets. In SAVE, zero-shot generation is facilitated by the spectral shift mechanism, which enables the model to apply text-driven edits directly to video frames by focusing on latent adjustments within a pre-trained T2I model. This approach allows SAVE to generate coherent video outputs in response to text prompts without dedicated training for each new prompt. Zero-shot capabilities in SAVE open possibilities for diverse applications, such as generating customized videos on demand, producing instant animations, or modifying existing video content in response to user-specific descriptions. By leveraging pre-trained structures and fine-tuning singular values selectively, SAVE's zero-shot generation provides a scalable, resource-efficient solution for dynamic content creation and prompt-driven video adaptation.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for adapting a text-to-image (T2I) diffusion model to edit video content based on a text prompt, the method comprising:
   a. receiving, by at least one processor, a video comprising a plurality of frames and a text prompt specifying modifications to visual elements in the video;
   b. performing spectral decomposition, by the at least one processor, on at least one weight matrix of the pre-trained T2I diffusion model to separate each matrix into a set of singular values and corresponding singular vectors;
   c. generating, by the at least one processor, a spectral shift parameter matrix by selectively adjusting only the singular values based on the text prompt, while maintaining the singular vectors unmodified;
   d. applying, by the at least one processor, a spectral shift regularizer to the spectral shift parameter matrix, wherein the spectral shift regularizer imposes more restricted adjustments to singular values with larger magnitudes and allows comparatively relaxed adjustments to singular values with smaller magnitudes;
   e. adapting, by the at least one processor, the pre-trained T2I diffusion model by incorporating the spectral shift parameter matrix, thereby creating an adapted model configured to modify specific visual elements within the video according to the text prompt; and
   f. outputting, by the at least one processor, an edited video in which the visual elements specified by the text prompt are modified in the plurality of frames, while preserving non-targeted visual elements and maintaining temporal coherence across frames.

2. The method of claim 1, wherein the spectral decomposition is performed on query matrices within attention layers of the T2I diffusion model, and each query matrix is decomposed into singular values and singular vectors that are adjusted exclusively based on the spectral shift parameter matrix.

3. The method of claim 1, further comprising calculating each adjustment in the spectral shift parameter matrix as a function of the text prompt, wherein the adjustment selectively increases or decreases each singular value to correspond with prompt-specified changes in visual content.

4. The method of claim 1, wherein the spectral shift regularizer is configured to apply a rectified linear unit (ReLU) activation function to each adjustment in the spectral shift parameter matrix, the ReLU activation function limiting the adjustment of each singular value to a predetermined maximum value.

5. The method of claim 1, further comprising initializing a temporal embedding across the plurality of frames in the video, wherein the temporal embedding is configured to enforce frame-to-frame coherence as the spectral shift parameter matrix propagates adjustments throughout the adapted model.

6. The method of claim 1, wherein the adapted model is configured to maintain non-targeted regions of the video unchanged by limiting spectral shift adjustments to regions or features specified in the text prompt.

7. The method of claim 1, further comprising generating cross-attention maps based on the text prompt to identify target regions within the latent representations of each frame, wherein the cross-attention maps serve to direct spectral shift adjustments to prompt-relevant areas within the video.

8. The method of claim 1, wherein the spectral shift parameter matrix is iteratively fine-tuned over a set number of epochs to optimize alignment of the adapted model's output with the text prompt, wherein each epoch updates the spectral shift adjustments according to differences between the model output and prompt-specified content.

9. The method of claim 1, further comprising generating an edited video output by processing the adapted model's latent representations of the video frames through a diffusion process, wherein the diffusion process applies adjustments from the spectral shift parameter matrix to produce frames aligned with the text prompt.

10. The method of claim 1, wherein the adapted model employs classifier-free guidance to balance between original video content and the prompt-directed edits, and the classifier-free guidance operates by scaling the influence of prompt-driven modifications within the spectral shift parameter matrix.

11. A method for adapting a text-to-image (T2I) diffusion model for text-driven video editing, the method comprising:
   a. receiving, by at least one processor, an input video comprising a plurality of frames and an editing prompt;
   b. encoding, by the at least one processor, each frame of the input video to obtain clean latent representations, wherein the encoding reduces spatial redundancy and prepares the frames for diffusion-based processing;
   c. initializing, by the at least one processor, an inflated text-to-video (T2V) model from the T2I diffusion model, wherein the T2V model includes temporal layers that manage frame-to-frame coherence and spatial consistency during the editing process;
   d. performing, by the at least one processor, spectral decomposition on each attention layer's query matrices in the T2V model to separate each matrix into singular values and singular vectors, enabling controlled adaptation of model weights;

e. generating, by the at least one processor, a spectral shift parameter matrix by calculating differential adjustments to the singular values without modifying the singular vectors, where the spectral shift parameter matrix applies a rectified linear unit (ReLU) function to constrain adjustments;

f. applying, by the at least one processor, a spectral shift regularizer to selectively adjust each singular value based on its magnitude, wherein larger singular values are constrained more tightly than smaller singular values to limit deviations in model behavior;

g. fine-tuning, by the at least one processor, the T2V model by iteratively optimizing the spectral shift parameter matrix across frames to align the model output with the editing prompt; and h. outputting, by the at least one processor, an edited video in which the changes conform to the prompt specifications while preserving temporal coherence and maintaining the original video's background.

12. The method of claim 11, wherein the fine-tuning further comprises sampling a noise embedding at each time step for each frame, wherein the noise embedding is used in a forward diffusion process to gradually increase noise, producing a set of progressively noised latent frames.

13. The method of claim 11, wherein the spectral shift regularizer dynamically scales adjustments in inverse proportion to the magnitude of each singular value, thereby facilitating finer adjustments for minor components and tighter control over major components.

14. The method of claim 11, wherein the input video is encoded as a sequence of temporally aligned latents, and the editing prompt guides the adjustments to specific regions or objects within the video frames.

15. The method of claim 11, further comprising using a classifier-free guidance scale (scfg) hyperparameter to balance between the original content and the prompt-directed edits, wherein an scfg value of 1 preserves the original content and higher values intensify the influence of the prompt on the final video output.

16. The method of claim 11, further comprising applying Deterministic Denoising Diffusion Implicit Model (DDIM) inversion to decode the noised latent frames, granularly reconstructing the frames according to the adjusted singular values guided by the prompt.

17. The method of claim 11, wherein the method performs iterative steps to minimize the noise discrepancy between the model's noise estimates and the actual frame noise, updating the model parameters to improve prompt-specific alignment.

18. The method of claim 11, wherein frame-wise consistency is maintained by initializing a temporal embedding across frames, allowing the model to retain spatial and temporal coherence as adjustments propagate through each frame.

19. The method of claim 11, wherein the editing prompt is used to modify localized features in the video, including color, object identity, or movement direction, while preserving the continuity and context of non-targeted areas in each frame.

20. The method of claim 11, wherein the T2V model is fine-tuned using a gradient-based optimization process that calculates a prompt-specific loss to iteratively refine the spectral shift parameters across a specified number of time steps.

21. A method for zero-shot video generation from a text prompt using a pre-trained text-to-image (T2I) diffusion model, the method comprising:

a. receiving, by at least one processor, a text prompt describing the desired video content, wherein the prompt specifies attributes of objects and actions within a multi-frame sequence;

b. initializing, by the at least one processor, a pre-trained T2I model with temporal modifications, producing a T2V model that includes frame-wise attention mechanisms adapted for video generation;

c. applying frame attention, by the at least one processor, to generate temporally coherent frames based on the prompt without requiring task-specific fine-tuning, wherein the frame attention uses fixed keys and values derived from initial frames' latent representations;

d. employing, by the at least one processor, sparse-causal cross-frame attention to link each frame to the immediate preceding frames, allowing temporal coherence while minimizing computational complexity;

e. utilizing, by the at least one processor, spatio-temporal attention to create an attention map that spans all frames within the sequence, ensuring spatial continuity of objects and maintaining alignment across frames; and f. generating, by the at least one processor, a multi-frame video that reflects the prompt-specified attributes in a temporally consistent manner, forming a coherent video sequence from the generated frames.

22. The method of claim 21, wherein the cross-frame attention mechanism includes causal masking, ensuring that each frame only references prior frames to maintain causal consistency.

23. The method of claim 21, wherein frame attention is limited to a subset of frames designated as anchor frames, from which keys and values propagate through subsequent frames to maintain temporal structure.

24. The method of claim 21, further comprising encoding the prompt with a Contrastive Language-Image Pre-training (CLIP) text encoder, producing prompt embeddings that serve as input conditions for frame generation.

25. The method of claim 21, wherein sparse-causal attention only references frames within a defined temporal window, reducing computation while maintaining temporal coherence for objects that persist across multiple frames.

26. The method of claim 21, further comprising calculating spectral shift adjustments for singular values associated with attention weights, using a ReLU function to bound adjustments within a pre-specified range, thus ensuring stable generation across frames.

27. The method of claim 21, wherein temporal embeddings are initialized for each frame sequence to enhance zero-shot generation capabilities by capturing the prompt-specific motion dynamics across frames.

28. The method of claim 21, wherein the T2V model is configured with tunable parameters adjusted at runtime to emphasize specific aspects of the prompt, including object placement and motion direction.

29. The method of claim 21, further comprising applying Deterministic Denoising Diffusion Implicit Model (DDIM) inversion to translate noisy latent representations into temporally synchronized frames based on the encoded prompt.

30. The method of claim 21, wherein the generated video includes multi-object transformations based on the prompt, with cross-frame attention mechanisms ensuring that each object retains position and appearance coherence across frames, aligning with the specified attributes in the prompt.

\* \* \* \* \*